(12) United States Patent
Park

(10) Patent No.: US 11,715,981 B2
(45) Date of Patent: Aug. 1, 2023

(54) ELECTRONIC DEVICE FOR WIRELESSLY TRANSMITTING OR RECEIVING POWER AND METHOD FOR OPERATING THE SAME

(71) Applicant: Samsung Electronics Co., Ltd., Gyeonggi-do (KR)

(72) Inventor: Seho Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 81 days.

(21) Appl. No.: 17/317,142

(22) Filed: May 11, 2021

(65) Prior Publication Data

US 2021/0351631 A1   Nov. 11, 2021

Related U.S. Application Data

(60) Provisional application No. 63/022,766, filed on May 11, 2020.

(30) Foreign Application Priority Data

Nov. 16, 2020  (KR) .......... 10-2020-0152591

(51) Int. Cl.
*H02J 50/80* (2016.01)
*H02J 50/60* (2016.01)
(Continued)

(52) U.S. Cl.
CPC ............ *H02J 50/80* (2016.02); *H02J 7/02* (2013.01); *H02J 50/12* (2016.02); *H02J 50/60* (2016.02)

(58) Field of Classification Search
CPC ............ H02J 50/12; H02J 50/60; H02J 50/80
See application file for complete search history.

(56) References Cited

U.S. PATENT DOCUMENTS

2006/0086810 A1   4/2006  Diorio et al.
2009/0001941 A1*  1/2009  Hsu .................. H02J 50/402
                                          323/211
(Continued)

FOREIGN PATENT DOCUMENTS

JP    2017/070074    4/2017
KR    10-2019-0050301  5/2019
WO    WO 2017/070227  4/2017

OTHER PUBLICATIONS

International Search Report dated Aug. 17, 2021 issued in counterpart application No. PCT/KR2021/005825, 6 pages.

*Primary Examiner* — Rexford N Barnie
*Assistant Examiner* — Joseph N Inge
(74) *Attorney, Agent, or Firm* — The Farrell Law Firm, P.C.

(57) ABSTRACT

An electronic device includes a power transmitting circuit configured to transmit power to a wireless power receiver, a communication circuit configured to perform communication with the wireless power receiver, and a control circuit configured to control the power transmitting circuit to apply first power to a coil of the power transmitting circuit, control the power transmitting circuit to stop applying the first power and to prevent power from being applied to the coil during a first period, identify a first Q-factor during the first period, control the power transmitting circuit to apply, to the coil, a second power based on a calibration operation for identifying at least one parameter used for identifying a power loss during power transmission, control the power transmitting circuit to stop applying the second power and to prevent power from being applied to the coil during a second period, identify a second Q-factor during the second period, and identify a validity of the at least one parameter based on the first Q-factor or the second Q-factor.

14 Claims, 15 Drawing Sheets

(51) Int. Cl.
*H02J 50/12* (2016.01)
*H02J 7/02* (2016.01)

(56) References Cited

U.S. PATENT DOCUMENTS

| | | | |
|---|---|---|---|
| 2014/0015329 A1* | 1/2014 | Widmer | B60L 53/37 |
| | | | 307/104 |
| 2014/0125287 A1* | 5/2014 | Nakano | H02J 50/80 |
| | | | 307/104 |
| 2017/0093214 A1* | 3/2017 | Watanabe | H02J 50/60 |
| 2017/0229926 A1* | 8/2017 | Oettinger | H02J 50/80 |
| 2017/0358953 A1* | 12/2017 | Trudeau | H02J 50/12 |
| 2018/0115197 A1* | 4/2018 | Li | H02J 50/60 |
| 2019/0131826 A1* | 5/2019 | Park | H02J 50/60 |
| 2019/0148986 A1* | 5/2019 | Yoo | H02J 50/12 |
| | | | 307/104 |
| 2019/0165618 A1* | 5/2019 | Chen | H02J 50/60 |
| 2019/0296559 A1* | 9/2019 | Gluzman | H04B 5/0037 |
| 2019/0326782 A1* | 10/2019 | Graham | H02J 50/90 |
| 2019/0326786 A1* | 10/2019 | Kim | H02J 50/60 |
| 2020/0235612 A1* | 7/2020 | Muratov | G06F 18/2321 |
| 2020/0381945 A1* | 12/2020 | Wang | H02J 50/90 |
| 2021/0167637 A1* | 6/2021 | Schwartz | H02J 50/70 |
| 2021/0194295 A1* | 6/2021 | Kim | H02J 50/80 |
| 2021/0273492 A1* | 9/2021 | Sherman | H04B 17/11 |

* cited by examiner

ELECTRONIC DEVICE FOR WIRELESSLY TRANSMITTING OR RECEIVING POWER AND METHOD FOR OPERATING THE SAME

CROSS-REFERENCE TO RELATED APPLICATION(S)

This application is based on and claims priority under 35 U.S.C. § 119 to U.S. Provisional Patent Application No. 63/022,766, filed on May 11, 2020 in the United States Patent and Trademark Office, and Korean Patent Application No. 10-2020-0152591, filed on Nov. 16, 2020 in the Korean Intellectual Property Office, the disclosures of which are incorporated by reference herein in their entireties.

BACKGROUND

1. Field

The present disclosure relates generally to electronic devices for wirelessly transmitting power, and methods for operating the same.

2. Description of Related Art

The Wireless Power Consortium (WPC) standard (or Qi standard) supports various foreign object detection (FOD) techniques. For example, an electronic device that wirelessly transmits power may apply a ping signal to a coil and determine whether a wireless power receiver or a foreign object is placed in the charging area based on whether a change in characteristics (e.g., a frequency and/or quality factor (Q-factor)) occurs. For example, an electronic device that wirelessly transmits power may receive (or demodulate) information about the level of received power from the wireless power receiver during a power transfer. The electronic device may identify the level of a power loss $P_{loss}$ based on information about the level of transmitted power $P_{PT}$ and the level of received power $P_{PR}$ and determine whether a foreign object is placed nearby during power transfer based on the level of power loss $P_{loss}$.

The power loss $P_{loss}$ when a foreign object is placed nearby may indicate the level of power dissipated in the foreign object from the magnetic field of the electronic device. The electronic device may identify the level of transmitted power $P_{PT}$ by subtracting the internal power loss $P_{PTloss}$ dissipated in the electronic device from the level of power $P_{in}$ provided to the input terminal. The internal power loss $P_{PTloss}$ in the electronic device may include at least one of the power loss in the inverter, the power loss in the primary coil, the power loss in the resonant capacitor, the power loss in the shielding of the primary coil assembly, or the power loss in any metal part of the electronic device. Further, the received power $P_{PR}$ may be identified by adding the level of power $P_{out}$ at the output terminal and the internal power loss $P_{prloss}$ dissipated in the wireless power receiver by the wireless power receiver. The internal power loss $P_{Prloss}$ of the wireless power receiver may include at least one of the power loss in the rectifier, the power loss in the secondary coil, the power loss in the resonant capacitor, the power loss in the shielding of the secondary coil assembly, or the power loss in any metal part of the wireless power receiver.

The electronic device and the wireless power receiver may calculate the above-described internal power losses $P_{PTloss}$ and $P_{Prloss}$ and, in this case, a systematic bias may occur. Such a bias may degrade the accuracy of foreign object detection. The electronic device and the wireless power receiver may perform calibration to remove an influence caused by the bias. During calibration, the electronic device and/or the wireless power receiver may identify parameters using the level (e.g., a magnitude) of the transmitted power $P_{PT}$ and the level of the received power $P_{PR}$ under a plurality of load conditions. The electronic device and the wireless power receiver may calibrate the transmitted power $P_{PT}$ and/or the received power $P_{PR}$ using the identified parameters and may thereby remove the influence caused by the bias, enhancing the accuracy of foreign object detection. However, if a foreign object is placed nearby during calibration, inaccurate parameters may be obtained. If an inaccurate parameter is used for foreign object detection, the accuracy of foreign object detection may be degraded.

SUMMARY

In accordance with an aspect of the present disclosure, an electronic device for wirelessly transmitting power includes a power transmitting circuit and a control circuit configured to control the power transmitting circuit to apply a first power to a coil of the power transmitting circuit, control the power transmitting circuit to stop applying the first power and prevent power from being applied to the coil during a first period, identify a first Q-factor during the first period, control the power transmitting circuit to apply, to the coil, a second power based on a calibration operation for identifying at least one parameter used for identifying a power loss during power transmission, control the power transmitting circuit to stop applying the second power and prevent power from being applied to the coil during a second period, identify a second Q-factor during the second period, and identify a validity of the at least one parameter based on at least one of the first Q-factor or the second Q-factor.

In accordance with another aspect of the present disclosure, an electronic device for wirelessly receiving power includes a coil configured to receive power from an electronic device, a rectifier configured to rectify alternating current (AC) power output from the coil into direct current (DC) power, a communication circuit, and a processor configured to control the communication circuit to transmit a first data packet for requesting that a first power is not applied during a first period, while the first power is received, and control the communication circuit to transmit a second data packet for requesting that a second power is not applied during a second period, while the second power is received based on a calibration operation for identifying at least one parameter used for identifying power loss while transmitted power is received through the coil.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
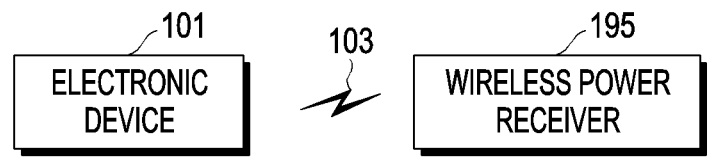
FIG. 1 is a block diagram illustrating a wireless power receiver and an electronic device, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

According to various embodiments of the disclosure, an electronic device, a wireless power receiver, and a method for operating the same may verify parameters obtained as a result of calibration, based on the Q-factor identified in accordance with the start and/or end of the calibration.

According to various embodiments of the disclosure, an electronic device, a wireless power receiver, and a method for operating the same may identify the validity of a parameter obtained as a result of calibration, based on the Q-factor identified at a designated time and enhance the accuracy of foreign object detection.

FIG. 1 is a block diagram illustrating a wireless power receiver and an electronic device, according to an embodiment.

Referring to FIG. 1, an electronic device 101 may wirelessly transmit power 103 to a wireless power receiver 195 through, for example, an induction scheme. When the electronic device 101 adopts the induction scheme, the electronic device 101 may include a power source, a direct current (DC)-alternating current (AC) converting circuit, an amplifying circuit, an impedance matching circuit, at least one capacitor, at least one coil, and/or a communication modulation/demodulation circuit. The at least one capacitor together with the at least one coil may constitute a resonance circuit. The electronic device 101 may be implemented in a manner defined in the WPC standards (or Qi standards).

Alternatively, the electronic device 101 may transmit the power 103 through a resonance scheme. Adopting the resonance scheme, the electronic device 101 may include a power source, a DC-AC converting circuit, an amplifying circuit, an impedance matching circuit, at least one capacitor, at least one coil, and an out-band communication circuit (e.g., a Bluetooth™ low energy (BLE) communication circuit). The at least one capacitor and the at least one coil may constitute a resonance circuit. The electronic device 101 may be implemented in a manner defined in the Alliance for Wireless Power (A4WP) standards (or Air Fuel Alliance (AFA) standards). The electronic device 101 may include a coil that is capable of produce a magnetic field when letting an electric current flow thereacross by a resonance or induction scheme. The process of generating an induced magnetic field by the electronic device 101 may be referred to as the "electronic device 101 wirelessly transmits the power 103." Further, the wireless power receiver 195 may include a coil that produces an induced electromotive force by the magnetic field generated around and varying in magnitude over time. The process of producing an induced electromotive force through the coil may be referred to as the "wireless power receiver 195 wirelessly receives the power 103." For example, the electronic device 101 may be implemented in the manner defined in wireless power transmission-related standards, such as the airfuel inductive (e.g., Power Matters Alliance (PMA)) standard, the airfuel resonant (e.g., rezence) standard, or a Qi standard.

The electronic device 101 may communicate with the wireless power receiver 195 according to, for example, an in-band scheme. The electronic device 101 may modulate data to be transmitted according to a frequency shift keying (FSK) modulation scheme, and the wireless power receiver 195 may perform modulation according to an amplitude shift keying (ASK) modulation scheme. The electronic device 101 and/or the wireless power receiver 195 may determine the data transmitted from the counterpart device based on the frequency and/or amplitude of the current, voltage, or power of the coil. The operation of performing modulation based on the ASK modulation scheme and/or the FSK modulation scheme may be understood as an operation for transmitting data according to the in-band communication scheme. The operation of determining the data transmitted from the counterpart device by performing demodulation based on the frequency and/or amplitude of the current, voltage, or power of the coil may be understood as an operation for receiving data according to the in-band communication scheme.

Alternatively, the electronic device 101 may communicate with the wireless power receiver 195 according to an out-of-band scheme. The electronic device 101 or the wireless power receiver 195 may transmit and receive data using a communication circuit (e.g., a BLE communication module) provided separately from the coil or patch antenna.

As set forth herein, when the electronic device 101 or the wireless power receiver 195 performs a particular operation, this may mean that various hardware devices, e.g., a control circuit, such as a processor (e.g., a transmission integrated circuit (IC) or micro controlling unit (MCU)) or coil included in the electronic device 101 or the wireless power receiver 195, performs the particular operation. When the electronic device 101 or the wireless power receiver 195 performs a particular operation, this may also mean that the processor controls another hardware device to perform the particular operation. When the electronic device 101 or the wireless power receiver 195 performs a particular operation, this may mean that the processor or another hardware device triggers the particular operation as an instruction for performing the particular operation, which is stored in a storage circuit (e.g., a memory) of the electronic device 101 or the wireless power receiver 195, is executed.

Figure 2:
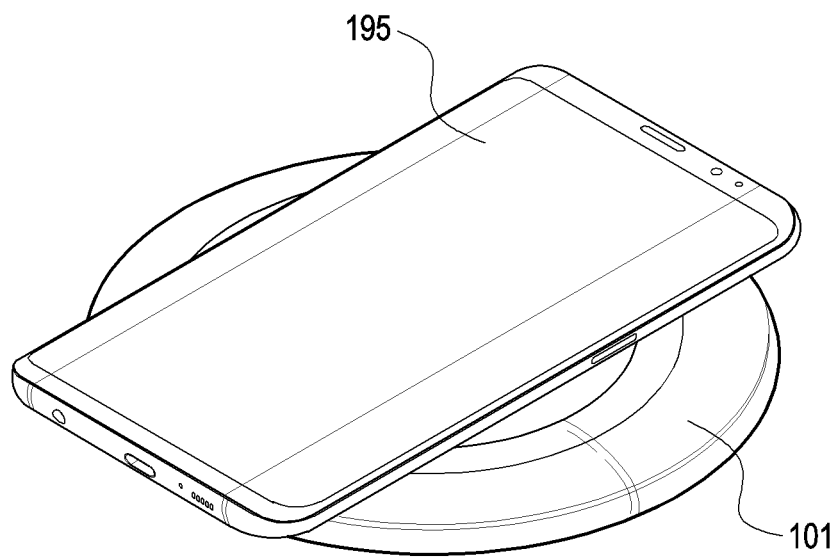
FIG. 2 is a view schematically illustrating a wireless charging system, according to an embodiment.

FIG. 2 is a view schematically illustrating a wireless charging system, according to an embodiment.

Referring to FIG. 2, a wireless charging system may include an electronic device 101 and a wireless power receiver 195. The electronic device 101 may be a charging pad that transmits wireless power based on the power supplied from a charger (e.g., a travel adapter (TA)). The electronic device 101, as a device including a wireless power transmission function, may be implemented as a smart phone, but is not limited thereto. The wireless power receiver 195 may be an electronic device, such as a smart phone or a wearable device, but is not limited thereto.

Figure 3:
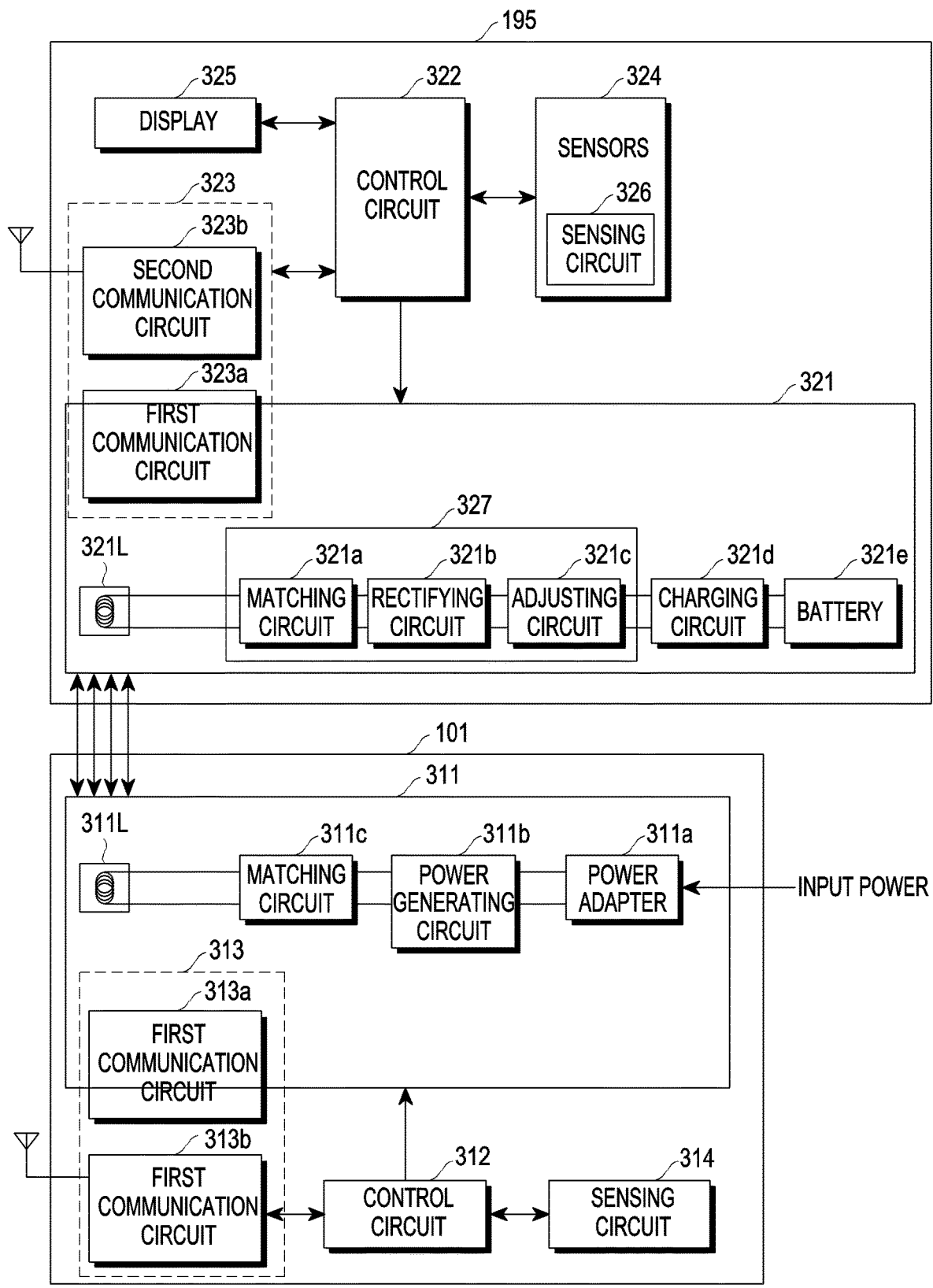
FIG. 3 is a block diagram illustrating a wireless charging system, according to an embodiment.

FIG. 3 is a block diagram illustrating a wireless charging system, according to an embodiment.

Referring to FIG. 3, a wireless charging system may include an electronic device 101 or a wireless power receiver 195. When the wireless power receiver 195 is mounted on the electronic device 101, the electronic device 101 may wirelessly supply power to the wireless power receiver 195.

The electronic device 101 may include a power transmitting circuit 311, a control circuit 312, a communication circuit 313, and/or a sensing circuit 314.

The power transmitting circuit 311 may include a power adapter 311a to receive power from the outside and to properly convert the received power, a power generating circuit 311b to generate power, and/or a matching circuit 311c to enhance the efficiency between a transmission coil 311L and a reception coil 321L.

The power transmitting circuit 311 may include at least one of a power adapter 311a, a power generating circuit 311b, a transmission coil 311L, or a matching circuit 311c to be able to transmit power to at least one wireless power receiver (e.g., a first wireless power receiver and a second wireless power receiver).

The control circuit 312 may control the electronic device 101, generate various messages (e.g., instructions) required for wireless power transmission, and transmit the messages to the communication circuit 313. The control circuit 312 may calculate power (e.g., an amount of power) to be transmitted to the wireless power receiver 195 based on information received from the communication circuit 313. The control circuit 312 may control the power transmitting circuit 311 to transmit the power generated by the transmission coil 311L to the wireless power receiver 195.

The communication circuit 313 may include at least one of a first communication circuit 313a or a second communication circuit 313b. The first communication circuit 313a may communicate with the first communication circuit 323a of the wireless power receiver 195 in an in-band (IB) communication scheme using a frequency equal to or adjacent to the frequency used for power transmission in the transmission coil 311L.

The first communication circuit 313a may communicate with the first communication circuit 323a of the wireless power receiver 195 using the transmission coil 311L. The data (or communication signals) generated by the first communication circuit 313a may be transmitted using the transmission coil 311L. The first communication circuit 313a may transfer data to the wireless power receiver 195 using an FSK modulation scheme. The first communication circuit 313a may communicate with the first communication circuit 323a of the wireless power receiver 195 by allowing the frequency of the power signal transmitted through the transmission coil 311L to be varied. Alternatively, the first communication circuit 313a may communicate with the first communication circuit 323a of the wireless power receiver 195 by permitting data to be included in or with the power signal generated by the power generating circuit 311b. For example, the first communication circuit 313a may perform modulation by raising or lowering the frequency of the power transmission signal. The wireless power receiver 195 may identify the data from the electronic device 101 by performing demodulation based on the frequency of the signal measured at the reception coil 321L.

The second communication circuit 313b may communicate with the second communication circuit 323b of the wireless power receiver 195 in an out-of-band (OOB) communication scheme using a frequency different from the frequency used for power transmission in the transmission coil 311L. For example, the second communication circuit 313b may obtain information (e.g., a voltage after the rectification, rectified voltage (Vrect) information, information about the current (Iout) flowing through the rectifying circuit 321b, various packets, authentication information, and/or a message) related to the charging state from the second communication circuit 323b using any one of various short-range communication schemes, such as Bluetooth™, BLE, wireless-fidelity (Wi-Fi), or a near-field communication (NFC).

The sensing circuit 314 may include one or more sensors and may detect at least one state of the power transmitter 301 using the one or more sensors.

The sensing circuit 314 may include at least one of a temperature sensor, a motion sensor, a magnetic field sensor (e.g., a Hall sensor), or a current (or voltage) sensor. The sensing circuit 314 may detect the temperature state of the electronic device 101 using the temperature sensor, and the motion state of the electronic device 101 using the motion sensor. In addition, the sensing circuit 314 may detect whether the electronic device is coupled with the wireless power receiver 195 using the magnetic field sensor, and detect the state of the output signal (e.g., a current level, a voltage level, and/or a power level) of the electronic device 101 using the current (or voltage) sensor.

The current (or voltage) sensor may measure signals at the power transmitting circuit 311. The current (or voltage) sensor may measure signals at, at least, part of the matching circuit 311c or the power generating circuit 311b. For example, the current (voltage) sensor may include a circuit for measuring signals at a front end of the transmission coil 311L.

The sensing circuit 314 may be a circuit for foreign object detection (FOD).

The wireless power receiver 195 may include a power receiving circuit 321, a processor 322, a communication circuit 323, sensors 324, a display 325, or a sensing circuit 326. The sensors 324 may include the sensing circuit 326.

The power receiving circuit 321 may include a reception coil 321L for wirelessly receiving power from the electronic device 101, an Rx integrated circuit (IC) 327, a charging circuit 321d (e.g., a power management integrated circuit (PMIC), a direct current/direct current (DC/DC) converter, a switched capacitor, or a voltage divider), and/or a battery 321e (e.g., the battery 189). The Rx IC 327 may include a matching circuit 321a connected to the reception coil 321L, a rectifying circuit 321b for rectifying the received AC power to DC power, or a power adjusting circuit (e.g., a low-dropout (LDO) circuit) 321c for adjusting the charging voltage.

The processor 322 may overall control the wireless power receiver 195, generate various messages required for wireless power reception, and transmit the generated messages to the communication circuit 323.

The communication circuit 323 may include at least one of a first communication circuit 323a or a second communication circuit 323b. The first communication circuit 323a may communicate with the electronic device 101 through the reception coil 321L.

The first communication circuit 323a may communicate with the first communication circuit 313a of the electronic device 101 using the reception coil 321L. The data (or communication signals) generated by the first communication circuit 323a may be transmitted using the reception coil 321L. The first communication circuit 323a may transmit data to the electronic device 101 using an ASK modulation scheme. For example, the first communication circuit 323a may cause a change in the load of the electronic device 101 according to the modulation scheme. Accordingly, at least one of the magnitudes of voltage, current, or power measured at the transmission coil 311L may be changed. The first communication circuit 313a of the electronic device 101 may identify data by the wireless power receiver 195 by demodulating the change in magnitude. The second communication circuit 323b may communicate with the electronic device 101 using any one of various short-range communication schemes, such as Bluetooth™, BLE, Wi-Fi, or NFC.

Packets, information, or data transmitted and received by the electronic device 101 and the wireless power receiver 195 may use at least one of the first communication circuit 323a or the second communication circuit 323b.

The sensors 324 may include one or more of a current/voltage sensor, a temperature sensor, an illuminance sensor, or an acceleration sensor. The sensors 324 may be the same as or separate components from the sensor module 1376 of FIG. 13.

The display 325 may display various types of display information required for wireless power transmission/reception.

The sensing circuit 326 may detect the electronic device 101 by sensing the detection signal or power received from the electronic device 101. The sensing circuit 326 may detect a signal variation at the input/output terminals of the rectifying circuit 321b, matching circuit 321, or coil 321L, based on the signal at the coil 321L generated by the signal output from the electronic device 101. The sensing circuit 326 may be included in the receiving circuit 321.

Figure 4:
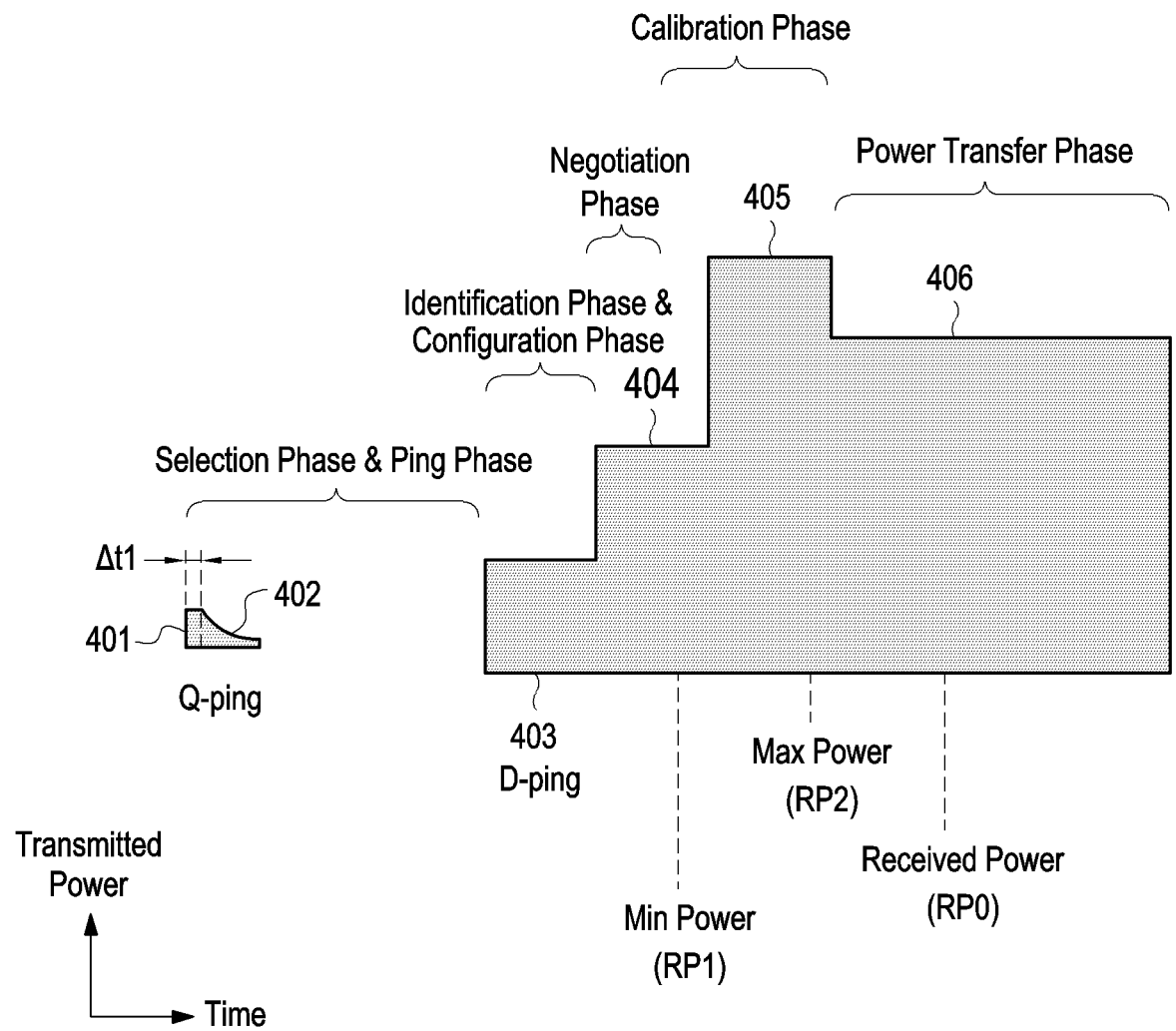
FIG. 4 illustrates a comparative example of a level of power input to a transmission coil of an electronic device, according to an embodiment.

FIG. 4 illustrates a comparative example of a level of power input to a transmission coil of an electronic device, according to an embodiment. It will be appreciated by one of ordinary skill in the art that the operation of the electronic device 101 according to the comparative example of FIG. 4 may also be performed by the electronic device 101 according to an embodiment of the disclosure.

Referring to FIG. 4, the electronic device 101 may periodically apply the ping signal 401 to the transmission coil 311L for the duration Δt1. When the application of the ping signal 401 is terminated, the power 402 of the transmission coil 311L of the electronic device 101 may be attenuated. For example, the attenuation in the time domain of the envelope of the voltage V(t) for the power 402 may follow Equation (1), below.

$$V(t) = V(0) \cdot \exp\left[-\frac{w \cdot t}{2 \cdot Q}\right] \quad (1)$$

V(0) may be the initial voltage value, ω may be the angular frequency of the AC signal, and Q may be the Q-factor. Accordingly, the Q-factor may be calculated using Equation (2), based on the voltages $V_1$ and $V_2$ corresponding to two time points $t_1$ and $t_2$ constituting the envelope. In Equation (2), shown below, T may be the period which is the reciprocal of the frequency.

$$Q = \frac{\pi \cdot (t_2 - t_1)}{T \cdot \ln\left[\frac{V(t_2)}{V(t_1)}\right]} \quad (2)$$

As described above, the electronic device 101 may perform Q-factor measurement based on the application of the ping signal 401. The electronic device 101 may store the Q-factor when no foreign object is disposed as a reference. When a foreign object is placed on the electronic device 101, the Q-factor may be changed (e.g., decreased). When the Q-factor measured later has a difference outside the tolerance range as a result of comparison with the reference, the electronic device 101 may identify that the wireless power receiver 195 or a foreign object is placed. Meanwhile, the electronic device 101 may detect the placement of the wireless power receiver 195 or a foreign object based on a change in the resonance frequency as well as the Q-factor.

The operations using the Q-factor may be replaced with operations using a change in resonant frequency, or may be replaced with operations using both of the Q-factors and the change in resonant frequency. The application of a ping signal 401 and the detection phase based on the Q factor and/or frequency may be referred to as a selection phase and a ping phase, and the ping signal 401 may be referred to as a Q-ping.

If a difference occurs based on the result of a comparison, the electronic device 101 may apply a digital ping signal 403. While the digital ping signal 403 is applied, the electronic device 101 may perform at least one operation corresponding to the identification phase and configuration phase with the wireless power receiver 195, and the corresponding operation may follow the Qi standard.

As described above, the electronic device 101 and the wireless power receiver 195 may perform in-band communication. When the electronic device 101 fails to obtain data from the wireless power receiver 195 while the digital ping signal 403 is applied (e.g., failure to verify valid data as a result of demodulation), the electronic device 101 may determine that a foreign object is positioned nearby. When the operations in the identification phase and configuration phase are successfully completed, the electronic device 101 may perform at least one operation corresponding to the negotiation phase while applying power 404, and the corresponding operation may follow (e.g., operations employing the Qi standard).

The electronic device 101 may receive a first received power packet RP1 from the wireless power receiver 195. Based on the reception of the first received power packet RP1, the electronic device 101 may enter a calibration phase. However, depending on the implementation, the electronic device 101 may receive the first received power packet after entering the calibration phase. Further, although the calibration phase is shown as differing from the power transfer phase in FIG. 4, this is merely an example, and the calibration phase may be understood as part of the power transfer phase.

The wireless power receiver 195 may provide a report for information about the strength of received power in a plurality of load states (e.g., a light load state and a heavy load state) in the calibration phase. Here, the load states may be classified based on the level of the current input to the load of the wireless power receiver 195 (or the level of the current output from the rectifier and/or the converter). A state in which the level of the current input to the load is relatively small may be referred to as a light state, and a state in which the level of the current input to the load is relatively large may be referred to as a heavy state.

The wireless power receiver 195 may transmit the first received power packet PR1 including the received power level in a first load state. The wireless power receiver 195 may identify the received power level based on the level of the received power and transmit (e.g., modulate) a first received power packet PR1 including the power level. Here, the received power level may be a value that is defined by the Qi standard, and may be a received power value or an estimated received power value. The received power level may be obtained as a result of processing (e.g., processing as defined by the Qi standard) the power level (e.g., in watts) measured (or estimated) by the wireless power receiver 195 but, without limitations thereto, the measured (or estimated) power level itself may be implemented.

The first received power packet RP1 is for indicating a first calibration data point, and the received power level included in the first received power packet RP1 may not be more than 10% of the reference power level included in the power transfer contract. The first received power packet may have a type value of "1" (e.g., 001), and the electronic device 101 may identify that the first received power packet RP1 is received based on the type value of "1".

The electronic device 101 may receive a second received power packet RP2 from the wireless power receiver 195 while the power 405 is applied. The wireless power receiver 195 may transmit the second received power packet RP2 including the received power level in a second load state. The second received power packet RP2 may be for indicating a second calibration data point (or its subsequent data point), and may be a value close to the reference power level included in the power transmission contract. The second received power packet may have a type value of "2", and the electronic device 101 may identify that the second received power packet RP2 is received based on the type value of "2" (e.g., 010).

The electronic device 101 may calculate a parameter based on the values of two (or more) calibration data points. For example, the electronic device 101 may identify the transmitted power level ($P_{transmitted}^1$) and received power level ($P_{received}^1$) in the first load state and the transmitted power level ($P_{transmitted}^2$) and received power level ($P_{received}^2$) in the second load state (e.g., a connected load state). The electronic device 101 may identify the slope (a) based on the interpolation defined by Equation (3), below, and may identify the intercept (b) defined by Equation (4), below.

$$(a) = \frac{P_{received}^2 - P_{received}^1}{P_{transmitted}^2 - P_{transmitted}^1} \quad (3)$$

$$(b) = \frac{P_{transmitted}^2 \cdot P_{received}^1 - P_{received}^2 \cdot P_{transmitted}^1}{P_{transmitted}^2 - P_{transmitted}^1} \quad (4)$$

After identifying the parameters, the electronic device 101 may enter a power transfer phase and apply power 406 for charging. The wireless power receiver 195 may identify the power $P_{transmitted}$ transmitted in the power transmission phase, and calibrate it into the power $P_{calibrated}$, as defined by Equation (5), below.

$$P_{calibrated} = (a) \cdot P_{transmitted} + (b) \quad (5)$$

Further, the electronic device 101 may identify the power loss $P_{loss}$ according to Equation (6), below.

$$P_{loss} = P_{calibrated} - P_{received} \quad (6)$$

$P_{received}$ in Equation (6) may be the received power level in the wireless power receiver 195 identified based on in-band communication from the power receiver 195. The electronic device 101 may determine whether a foreign object is placed while power transmission is underway based on whether the power loss $P_{loss}$ is greater than or equal to a preset reference value. Alternatively, the electronic device 101 may calculate the power loss using the result of performing calibration on the strength of the received power. However, the validity of the parameters (e.g., a and b) may be required to be ensured for accurate detection of the placement of a foreign object. If a foreign object is placed before or while entering the calibration phase, the parameters (e.g., (a) and (b)) may be inaccurate values. Accordingly, verification of at least one parameter calculated according to calibration is required.

Meanwhile, the above-described method for obtaining parameters (e.g., (a) and (b)) for a linear model based on the two calibration data is merely an example. Alternatively, the electronic device 101 may identify the calibration curve by processing (e.g., interpolating) a plurality of calibration data. The electronic device 101 may identify an effective foreign object detection (FOD) threshold from the calibration curve. The electronic device 101 may detect a foreign object based on whether the result of subtracting the received power level from the level of the transmitted power is greater than the effective FOD threshold.

The electronic device 101 may determine whether a foreign object is positioned nearby (e.g., placed in the vicinity of the electronic device 101) during the power transfer phase based on at least one parameter, the received power level included in the received power packet (e.g., RP0), and the power 406 for charging in the power transfer phase. However, when a foreign object is positioned nearby before or in the middle of the calibration phase, at least one parameter may be invalid, which may cause a decrease in the accuracy of detection of the placement of a foreign object.

Figure 5A:
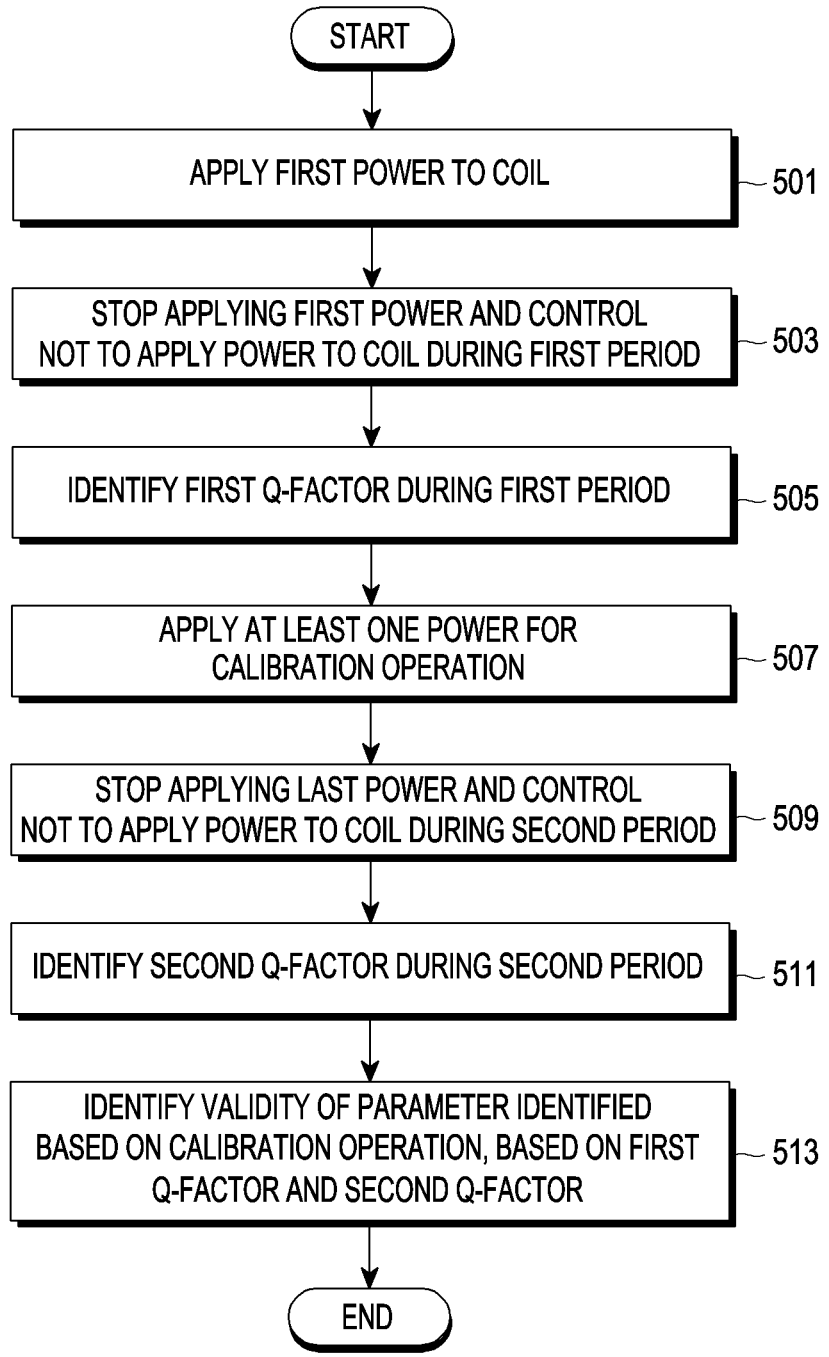
FIG. 5A is a flowchart illustrating a method for operating an electronic device, according to an embodiment.

FIG. 5A is a flowchart illustrating a method for operating an electronic device, according to an embodiment. The embodiment of FIG. 5A is described with reference to FIG.

Figure 5B:
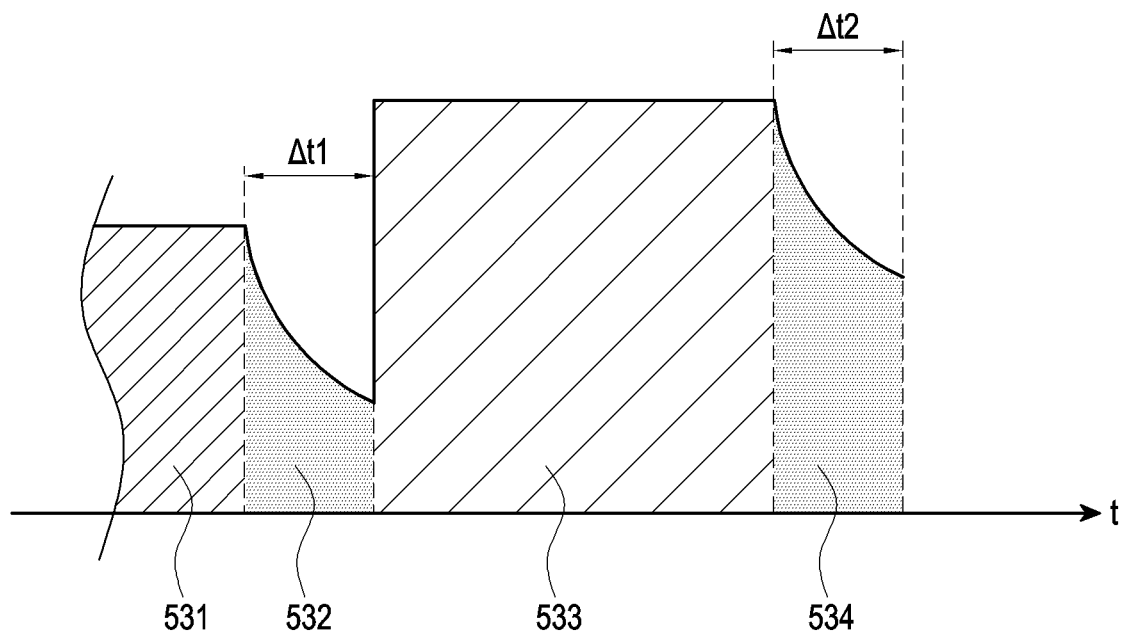
FIG. 5B is a graph illustrating a level of transmitted power of an electronic device, according to an embodiment of the disclosure.

5B. FIG. 5B is a graph illustrating a level of transmitted power of an electronic device, according to an embodiment.

In step 501, the electronic device 101 (e.g., the control circuit 312) may control to apply first power (e.g., the power 531 of FIG. 5B) to a coil (e.g., the transmission coil 311L). For example, the electronic device 101 may apply the first power 531 in the negotiation phase, but the time of application is not limited thereto. For example, the electronic device 101 may perform operations to be described below even in a re-calibration phase, and in this case, the electronic device 101 may apply the designated first power 531 before the re-calibration phase. For example, the first power 531 may be power based on the negotiation phase, but may also be power based on other various phases.

In step 503, the electronic device 101 may stop the application of the first power 531 and control to apply no power to the coil (e.g., restricts power from being applied to the coil) during a first period (e.g., Δt1 of FIG. 5B). The electronic device 101 may control to apply no power to the coil during the first period Δt1 based on a request from the wireless power receiver 195. The wireless power receiver 195 may determine the period Δt1 based on the state of the wireless power receiver 195 (e.g., the voltage and/or load current at the output terminal of the rectifier of the wireless power receiver 195), which is described below in greater detail. The wireless power receiver 195 may transmit a data packet including the determined first period Δt1. The electronic device 101 may stop application of power during the first period Δt1 requested from the wireless power receiver 195. Stopping the application of power may be performed based on control of the power adapter 311a and/or the power generating circuit 311b.

Additionally or alternatively, the electronic device 101 may determine the first period Δt1. The electronic device 101 may stop applying power for a predetermined first period Δt1. The electronic device 101 may determine the first period Δt1 based on the level of power received from the wireless power receiver 195 and/or the level of the load current, but determining the first period is not limited thereto or thereby.

In step 505, the electronic device 101 may identify a first Q-factor during the first period Δt1. As illustrated in FIG. 5B, as the application of the first power 531 is stopped, the power 532 may have a waveform that is attenuated and may correspond to an envelope. The electronic device 101 may identify the first Q-factor during the first period Δt1 based on the attenuation of the envelope of the power 532. The electronic device 101 may identify the first Q-factor based on a plurality of data (e.g., a plurality of voltages) during the first period Δt1 based on Equation (2), but identifying the first Q-factor is not limited thereto. The electronic device 101 may be configured to identify the first Q-factor based on the remaining lobes except for a designated number of first lobes among a plurality of lobes during the first period Δt1. In addition, other types of data for identifying the first Q-factor may be used.

After the first period Δt1, the electronic device 101 may apply at least one power (e.g., 533 in FIG. 5B) for a calibration operation in step 507. Although FIG. 5B illustrates that at least one power 533 has a constant level, this is merely an example, and the level of the power 533 may be changed during calibration. In step 509, the electronic device 101 may stop the application of the power (e.g., stops the application of the last power of the at least one power) according to the calibration operation and prevents power from being applied to the coil during a second period (e.g., Δt2 in FIG. 5B). Although FIG. 5B illustrates that at least one power 533 for the calibration operation has a constant level, if the level of the power 533 is changed, the electronic device 101 may stop the application of power during the second period Δt2 after the last power in order of time is applied. Similar to stopping the application of power in the first period Δt1, the electronic device 101 may stop the application of power during the second period Δt2 based on the reception of a data packet including the second period Δt2. Alternatively, the electronic device 101 itself may identify the second period Δt2. The second period Δt2 may be different from the first period Δt1, but may be set to be identical thereto.

The electronic device 101 may identify a second Q-factor during the second period Δt2 in step 511. Identifying the second Q-factor may be performed in the same manner as identifying the first Q-factor. In step 513, the electronic device 101 may identify the validity of the parameter identified based on the calibration operation, based on the first Q-factor and the second Q-factor. For example, the electronic device 101 may identify at least one parameter, such as parameters (e.g., (a) and (b)) for calibration, and/or an effective FOD threshold, based on the calibration operation.

The electronic device 101 may determine the validity of the parameter based on a result of the comparison between the first Q-factor and the second Q-factor. If a foreign object is placed on the electronic device 101 while calibration is performed, the difference between the first Q-factor and the second Q-factor may be identified as greater than or equal to a threshold difference. As described above, the placement of a foreign object may affect a Q-factor, and accordingly, the second Q-factor may be changed compared to the first Q-factor. The electronic device 101 may determine that the parameter is invalid based on the difference being greater than or equal to the threshold difference. The electronic device 101 may determine that a foreign object is additionally placed. When the difference is less than the threshold difference, the electronic device 101 may determine that the parameter is valid.

When the wireless power receiver 195 is first placed (e.g., positioned near the electronic device 101), the electronic device 101 may store the Q-factor measured based on a Q-ping signal (e.g., the ping signal 401) as a reference. The electronic device 101 may identify the validity of the parameter based on a result of comparison between the reference and the first Q-factor and/or a result of comparison between the reference and the second Q-factor. If a foreign object is placed during a time period after the electronic device 101 detects the placement of the wireless power receiver 195 and before the application of the first power 531 is stopped, the difference between the reference and the first Q-factor may be greater than or equal to the threshold difference. If a foreign object is placed while calibration is performed, the difference between the reference and the second Q-factor may be greater than or equal to the threshold difference. The electronic device 101 may determine that the parameter is invalid if it is determined that a foreign object is placed based on at least one comparison result.

Parameters for which the validity is not guaranteed may be discarded, and degradation of the accuracy of foreign object detection in the power transfer phase may be prevented.

Figure 6:
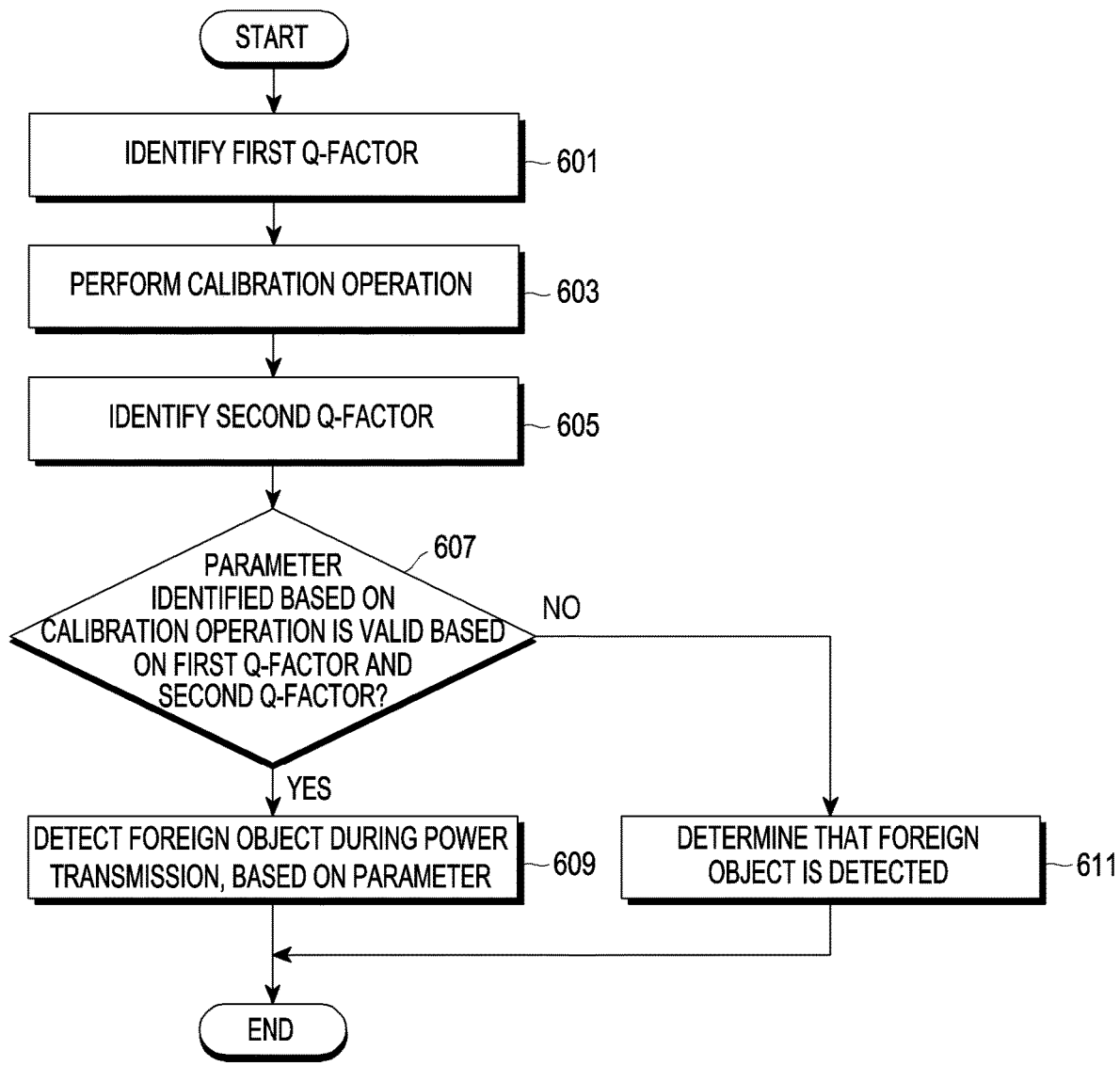
FIG. 6 is a flowchart illustrating a method for operating an electronic device, according to an embodiment.

FIG. 6 is a flowchart illustrating a method for operating an electronic device, according to an embodiment. For convenience of description, the operations previously described in detail will be briefly described below.

The electronic device 101 (e.g., the control circuit 312) may identify a first Q-factor in step 601. For example, the electronic device 101 may stop applying the power which is being applied and identify the first Q-factor. In step 603, the electronic device 101 may perform a calibration operation. In step 605, the electronic device 101 may identify the second Q-factor. For example, the electronic device 101 may stop applying power (e.g., the last power of the at least one power) associated with the calibration operation and identify the second Q-factor. In step 607, the electronic device 101 may determine whether the parameter identified based on the calibration operation is valid based on the first Q-factor and the second Q-factor. For example, the electronic device 101 may determine whether the identified parameter is valid based on a result of a comparison between the first Q-factor and the second Q-factor. When the difference between the first Q-factor and the second Q-factor is greater than or equal to the threshold difference, the electronic device 101 may determine that the identified parameter is invalid. When the difference between the first Q-factor and the second Q-factor is less than the threshold difference, the electronic device 101 may determine that the identified parameter is valid. The electronic device 101 may determine whether the parameter is valid based on a result of comparing the first Q-factor and the second Q-factor with a reference.

When it is determined that the parameter identified based on the calibration operation is valid (YES in step 607), the electronic device 101 may detect the foreign object during the power transmission operation based on the identified parameter in step 609. For example, when the electronic device 101 identifies a parameter (e.g., (a) or (b)) for calibrating the level of the transmitted power or the level of the received power, the electronic device 101 may calibrate either the level of the transmitted power or the level of the received power based on the parameter. The electronic device 101 may determine whether a foreign object is placed (e.g., positioned nearby) based on a difference between the calibrated level and the remaining level. For example, when the electronic device 101 identifies an effective FOD threshold as a result of the calibration, the electronic device 101 may determine whether a foreign object is positioned nearby based on whether the difference between the level of the transmitted power and the level of the received power is greater than or equal to the effective FOD detection threshold.

When it is determined that the parameter identified based on the calibration operation is invalid (NO in step 607), the electronic device 101 determines that a foreign object is detected in step 611. The electronic device 101 may perform an operation corresponding to detection of the foreign object. Further, the electronic device 101 may discard the parameter identified based on the calibration operation and perform a calibration operation again later. For example, after it is determined that the foreign object has been taken away, the electronic device 101 may perform a calibration operation again.

Figure 7:
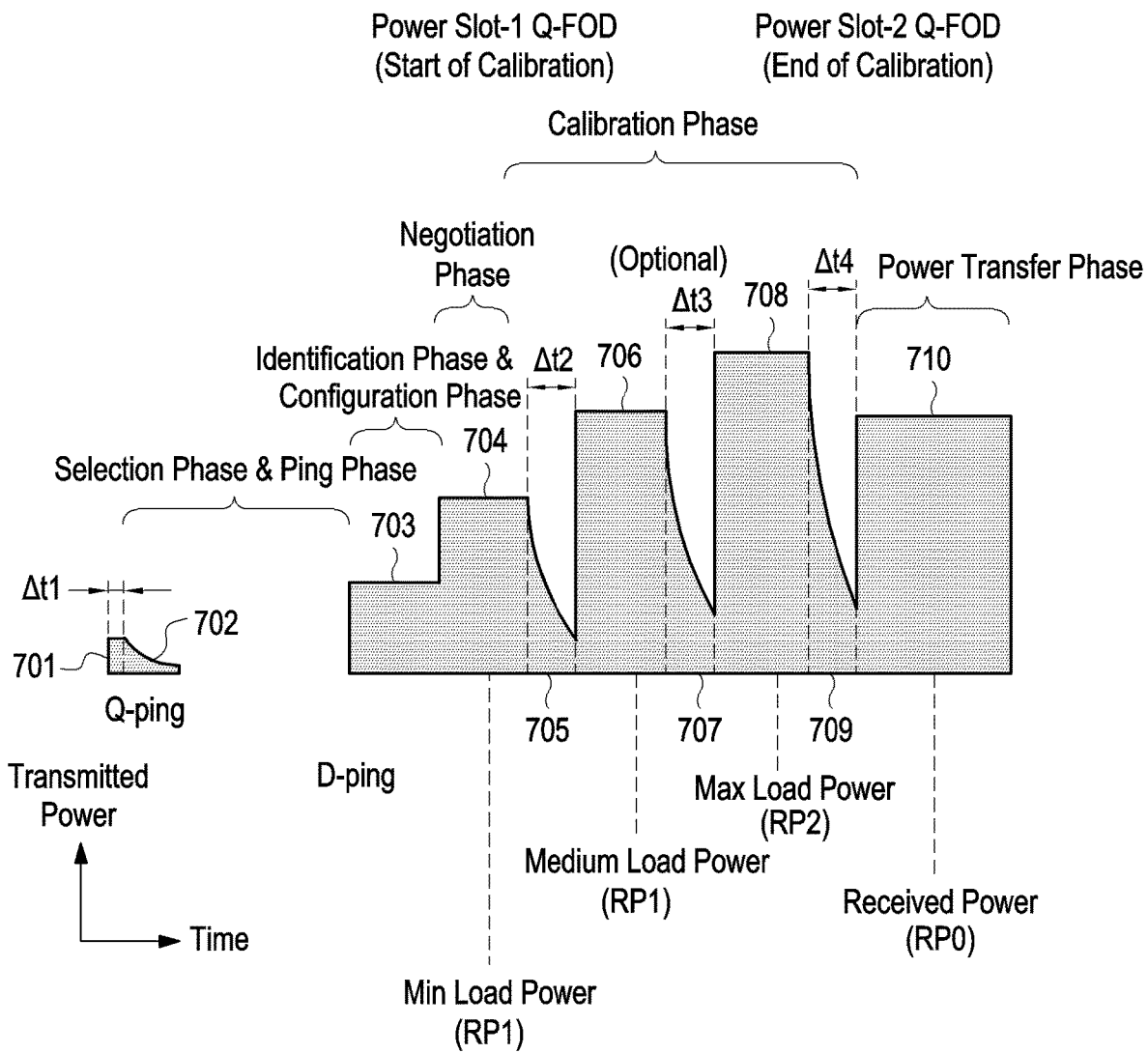
FIG. 7 is a graph illustrating a level of transmitted power of an electronic device, according to an embodiment.

FIG. 7 is a graph illustrating a level of transmitted power of an electronic device, according to an embodiment.

The electronic device 101 (e.g., the control circuit 312) may periodically apply a ping signal 701 to the transmission coil 311L for duration $\Delta t1$. The application of the ping signal 701 and other powers may be performed based on the control of the power adapter 311a and/or the power generating circuit 311b. When the application of the ping signal 701 is terminated, the power 702 of the transmission coil 311L of the electronic device 101 may be attenuated. Based on the attenuation of the power 702, the electronic device 101 may identify the Q-factor. The electronic device 101 may determine the placement of the wireless power receiver 195 or a foreign object based on comparison between a reference, which is the Q-factor when no foreign object is placed, and the identified Q-factor.

If a difference occurs based on the result of comparison, the electronic device 101 may apply a digital ping signal 703. While the digital ping signal 703 is applied, the electronic device 101 may perform at least one operation corresponding to the identification phase and configuration phase with the wireless power receiver 195. When the operations in the identification phase and configuration phase are successfully completed, the electronic device 101 may perform at least one operation corresponding to the negotiation phase while applying power 704.

The wireless power receiver 195 may enter (or maintain) a first load state (e.g., minimum load power). The wireless power receiver 195 may identify the received power level in the first load state. The wireless power receiver 195 may identify a power application interruption period (e.g., $\Delta t2$). The identification of the power application interruption period (e.g., $\Delta t2$) by the wireless power receiver 195 is described below. The wireless power receiver 195 may transmit a first received power packet PR1 including the received power level and the power application interruption period (e.g., $\Delta t2$) to the electronic device 101.

The electronic device 101 may receive the first received power packet PR1. The electronic device 101 may identify and store the level of the power 704 and the data included in the first received power packet PR1 as a first calibration data point. If the first calibration data point is accepted, the electronic device 101 may transmit an acknowledgment (ACK) packet to the electronic device 101.

The electronic device 101 may stop applying power during the power application interruption period (e.g., $\Delta t2$) included in the first received power packet PR1. When the application of the power 704 is terminated, the power 705 of the transmission coil 311L of the electronic device 101 may be attenuated. Based on the attenuation of the power 705, the electronic device 101 may identify the first Q-factor.

The wireless power receiver 195 may enter a second load state (e.g., medium load power). While the wireless power receiver 195 enters the second load state, power 706 may be applied to the transmission coil 311L of the electronic device 101. For example, as the load state of the wireless power receiver 195 changes, the level of the power 706 applied to the transmission coil 311L of the electronic device 101 may be changed, and/or the electronic device 101 may compare the level of the power 706 with the existing power 704 and change the same. The wireless power receiver 195 may identify the received power level in the second load state. The wireless power receiver 195 may identify a power application interruption period (e.g., $\Delta t3$). The wireless power receiver 195 may transmit a first received power packet PR1 including the received power level and the power application interruption period (e.g., $\Delta t3$) to the electronic device 101. Meanwhile, the type of the data packet is not limited and may be replaced by the second received power packet PR2.

The electronic device 101 may receive the first received power packet PR1. The electronic device 101 may identify and store the level of the power 706 and the data included in the first received power packet PR1 as a second calibration data point.

The electronic device 101 may stop applying power 706 during the power application interruption period (e.g., $\Delta t3$) included in the first received power packet PR1. When the application of the power 706 is terminated, the power 707 of the transmission coil 311L of the electronic device 101 may be attenuated. Based on the attenuation of the power 707, the electronic device 101 may identify the second Q-factor.

Additionally or alternatively, identification of the Q-factor may be optional at the other points than the start point and the end point of the calibration. The wireless power receiver 195 may refrain from requesting the electronic device 101 to stop applying power. In this case, the data packet transmitted by the wireless power receiver 195 may include only the received power level, or the power application interruption period may be set to zero.

The wireless power receiver 195 may enter a third load state (e.g., maximum load power). While the wireless power receiver 195 enters the third load state, power 708 may be applied to the transmission coil 311L of the electronic device 101. As the load state of the wireless power receiver 195 changes, the level of the power 708 applied to the transmission coil 311L of the electronic device 101 may be changed, and/or the electronic device 101 may compare the level of the power 708 with the existing power 706 and change the same. The wireless power receiver 195 may identify the received power level in the third load state. The wireless power receiver 195 may identify a power application interruption period (e.g., Δt4). The wireless power receiver 195 may transmit a second received power packet PR2 including the received power level and the power application interruption period (e.g., Δt4) to the electronic device 101. Meanwhile, the type of the data packet is not limited and may be replaced by the first received power packet PR1.

The electronic device 101 may receive the second received power packet PR2. The electronic device 101 may identify and store the level of the power 708 and the data included in the second received power packet PR2 as a third calibration data point.

The electronic device 101 may stop applying power 708 during the power application interruption period (e.g., Δt4) included in the second received power packet PR2. When the application of the power 708 is terminated, the power 709 of the transmission coil 311L of the electronic device 101 may be attenuated. Based on the attenuation of the power 709, the electronic device 101 may identify the third Q-factor.

The electronic device 101 may identify at least one parameter based on the first calibration data point, the second calibration data point, and the third calibration data point. The electronic device 101 may determine whether at least one parameter is valid based on the first Q-factor, the second Q-factor, and the third Q-factor. When it is determined that at least one parameter is valid, the electronic device 101 may perform a foreign object detection operation using at least one parameter while transmitting the power 710 for charging. The electronic device 101 may determine whether a foreign object is placed based on the at least one parameter and the level of the received power included in the identified data packet (e.g., RP0) via communication.

When it is determined that no foreign object is placed, the electronic device 101 may transmit an ACK packet in the RPJ packet or the RP2 packet. When it is determined that a foreign object is placed, the electronic device 101 may transmit a negative acknowledgment (NAK) packet. When it is determined that no foreign object is placed, the electronic device 101 may transmit a not defined (ND) response.

Figure 8:
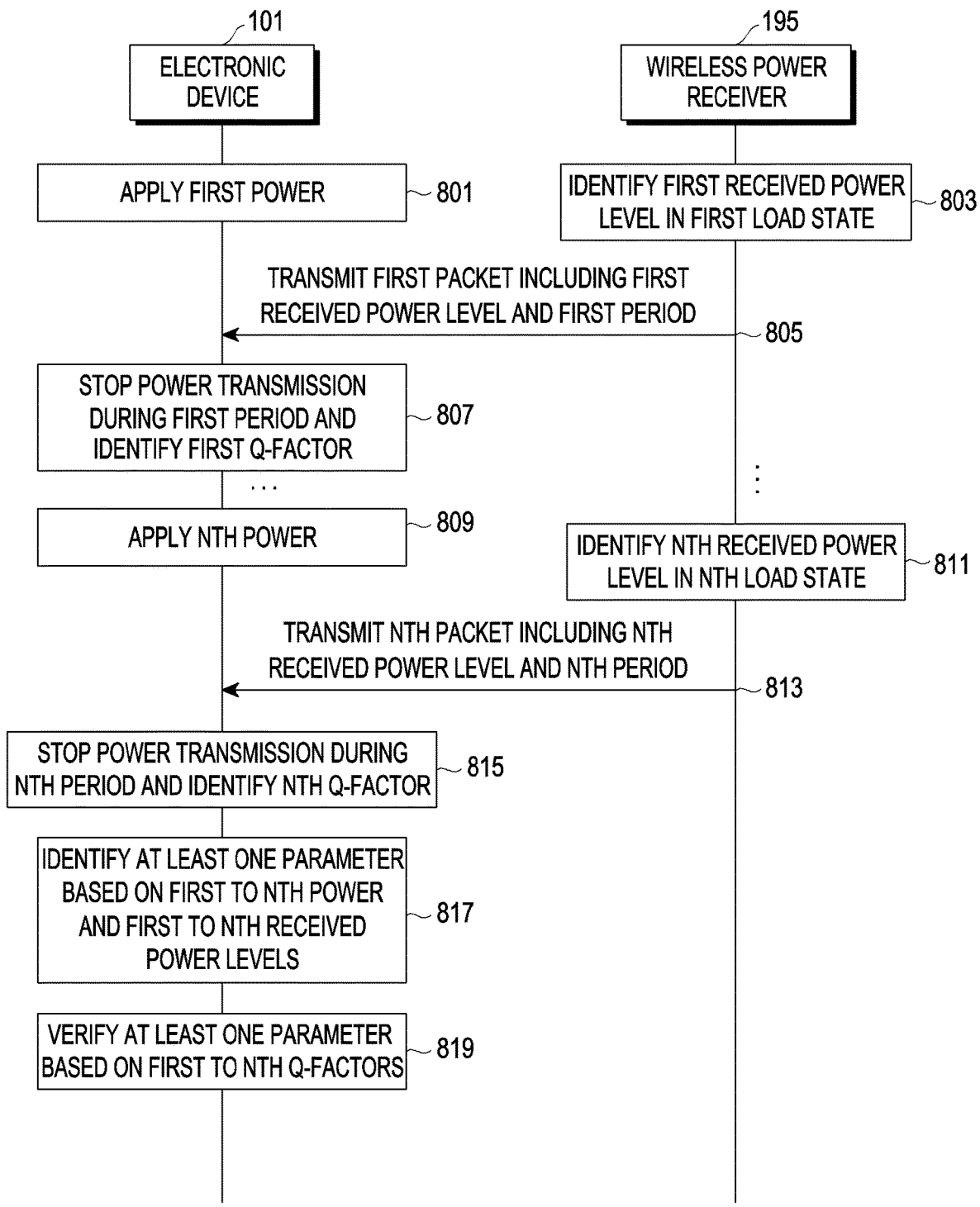
FIG. 8 is a view illustrating operations of an electronic device and a wireless power receiver, according to an embodiment.

FIG. 8 is a view illustrating operations of an electronic device and a wireless power receiver, according to an embodiment.

The electronic device 101 (e.g., the control circuit 312) may apply a first power to the transmission coil 311L in step 801. In step 803, the wireless power receiver 195 (e.g., the processor 322) may identify a first received power level in a first load state. In step 805, the wireless power receiver 195 may transmit a first packet including the first received power level and a first period. It is merely an example that the received power level and the period for requesting power interruption are included in one data packet, and in another embodiment, the wireless power receiver 195 may individually include the pieces of information in two different packets and transmit them. The transmission operation in FIG. 8 may be to perform modulation corresponding to the first packet of the wireless power receiver 195. In step 807, the electronic device 101 may stop transmitting power during the first period and analyze the attenuation at the transmission coil 311L during the first period, thereby identifying the first Q-factor.

The electronic device 101 (e.g., the control circuit 312) may apply Nth power to the transmission coil 311L in step 809. The Nth power may be different from or equal to the first power. In step 811, the wireless power receiver 195 (e.g., the processor 322) may identify an Nth received power level in an Nth load state. In step 813, the wireless power receiver 195 may transmit an Nth packet including the Nth received power level and an Nth period. In step 815, the electronic device 101 may stop transmitting power during the Nth period and analyze the attenuation at the transmission coil 311L during the Nth period, thereby identifying the Nth Q-factor. Here, N may be a natural number of 2 or more. When N is 3 or more, the electronic device 101 and the wireless power receiver 195 may further perform identification of the received power level, transmission of a packet, interruption of power transmission, and identification of a Q-factor N-2 times. Meanwhile, in the intermediate operations except for the first operation and the last operation, interruption of power transmission and identification of the Q-factor may be omitted.

In step 817, the electronic device 101 may identify at least one parameter based on the first to Nth power and the first to Nth received power levels. In step 819, the electronic device 101 may verify the validity of at least one parameter based on the first to Nth Q-factors.

Figure 9A:
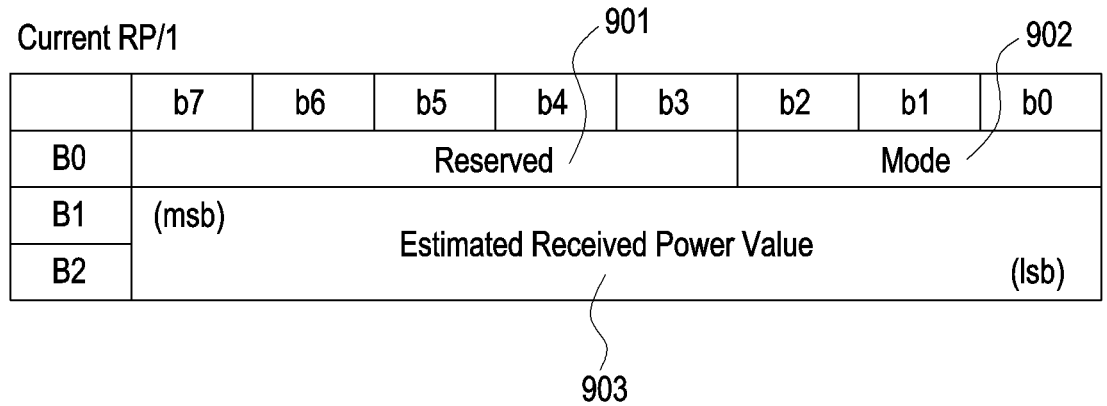
FIG. 9A is a comparative example of a view illustrating a structure of a data packet, according to an embodiment.

FIG. 9A is a view illustrating a comparative example of a structure of a data packet, according to an embodiment.

According to the comparative example, the wireless power receiver 195 may transmit an RP1 packet having the structure of FIG. 9A to the electronic device 101. The RP1 packet may be based on a 24-bit received power packet defined in the Qi standard. The RP1 packet may include a reserved field 901, a mode field 902, and an estimated received power value field 903. The estimated received power value field 903 or 915 may be referred to as a received power value according to the version of the standard. The bit string expressed in the mode field 902 or 914 may provide additional information about the received power value. For example, "1" (001) in the mode field 902 may indicate the first load state, and "2" (010) may indicate the second load state. The estimated received power value is a value obtained by processing the level of the received power measured by the wireless power receiver 195, and may be one of the above-described received power levels, and used as a calibration data point.

Figure 9B:
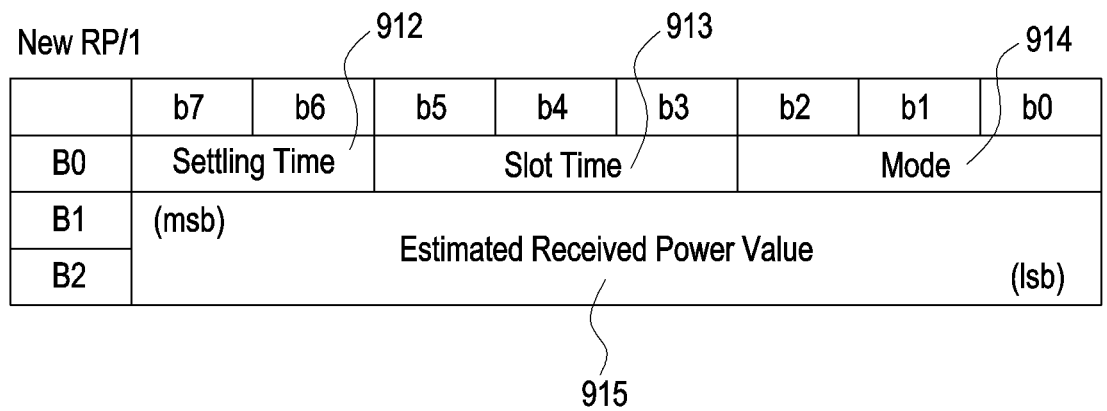
FIG. 9B is a view illustrating a structure of a packet RP1 of received power transmitted from a wireless power receiver, according to an embodiment.

FIG. 9B is a view illustrating a structure of a packet RP1 of received power transmitted from a wireless power receiver 195, according to an embodiment. The wireless power receiver 195 may include a slot time 913 in a data packet using part of the existing reserved field 901. The slot time 913 may have a value of 0 to 8, of which 0 may indicate that the power application interruption period is 0. When the slot time 913 is 0, the electronic device 101 may skip power interruption and Q-factor measurement. The values may be individually matched to power application interruption periods. For example, 1 may represent 80 microseconds (µs), 2 may represent 100 µs, and 3 may represent 120 µs. When the slot time 913 is a non-zero value, the electronic device 101 may skip power application interruption and Q-factor measurement during the corresponding period.

The wireless power receiver 195 may include a settling time 912 in the data packet using part of the existing reserved field 901. The settling time 912 may mean an interval between power slots when a plurality of power slots (i.e., interruption of power application and Q-factor measurement) are consecutively used. After the voltage Vrect at the output terminal of the rectifier of the wireless power receiver 195 is dropped by the power slot, its recovery may take time. If the settling time 912 is not sufficient, the voltage Vrect at the output terminal of the rectifier may not recover and drop, and in-band communication may be cut off. For example, the settling time 912 may have a value of 0 to 3, of which 0 may indicate that the settling time is 0. The values may be individually matched to settling times. For example, 1 may represent 50 ms, 2 may represent 100 ms, and 3 may represent 150 ms, but embodiments of the disclosure are not limited thereto. When the settling time 912 is a non-zero value, the electronic device 101 may wait for power application interruption for the corresponding period. In addition, after receiving an arbitrary PR/x packet (e.g., RP 1 or RP 2), the electronic device 101 may transmit a response (e.g., an ACK packet) after the included settling time 912.

The wireless power receiver 195 may identify version information (e.g., ID packet version) for the electronic device 101. If the power slot function is not supported based on the version information for the electronic device 101, the electronic device 101 may set the settling time 912 and the slot time 913 to 0 and transmit a data packet.

Figure 10:
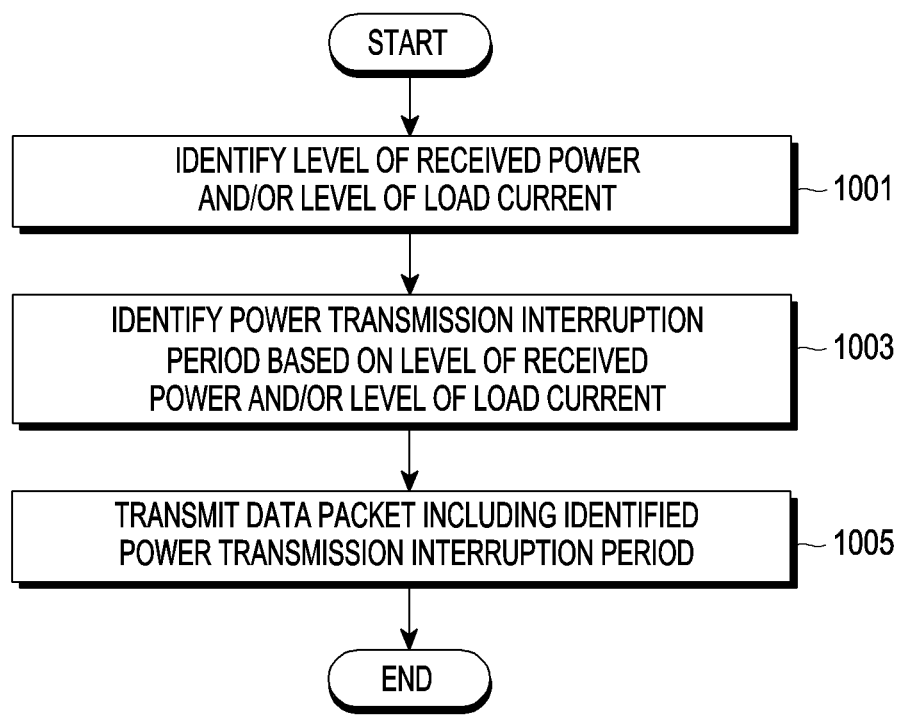
FIG. 10 is a flowchart illustrating a method for operating a wireless power receiver, according to an embodiment.

FIG. 10 is a flowchart illustrating a method for operating a wireless power receiver, according to an embodiment. FIG. 10 is described with reference to FIGS. 11A to 11F. FIGS. 11A, 11B, 11C, 11D, 11E, and 11F are views illustrating a peak reception voltage and an output voltage of a rectifier, according to various embodiments.

The wireless power receiver 195 (e.g., the processor 322) may identify the level of the received power and/or the level of the load current in step 1001. The wireless power receiver 195 may identify the voltage Vrect at the output terminal of the rectifier as the level of the received power but the position where the level of the received power is defined may vary. The wireless power receiver 195 may identify the current input to a load (e.g., a charger or PMIC) as the load current, but the position where the load current is defined may vary.

In step 1003, the wireless power receiver 195 may identify a power transmission interruption period based on the level of the received power and/or load current.

Figure 11A:
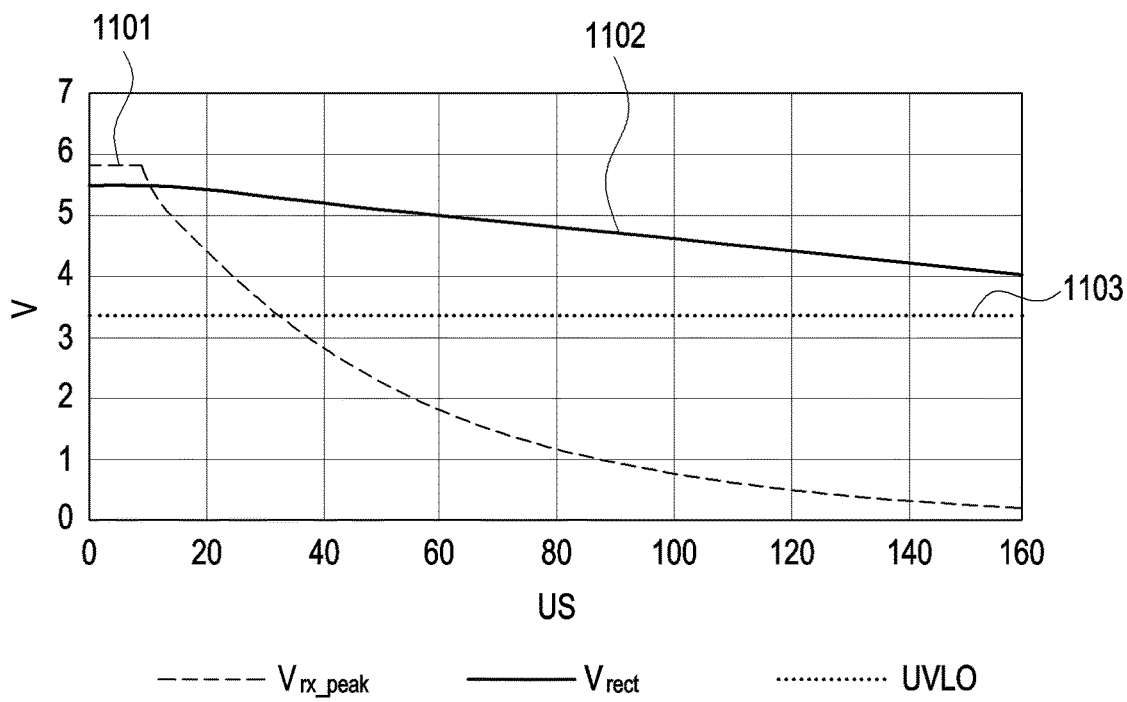
FIG. 11A is a view illustrating a peak reception voltage and an output voltage of a rectifier, according to an embodiment.

Referring to FIG. 11A, in the first load state, the load current of the wireless power receiver 195 may be 200 milliamps (mA), and the initial value of the output voltage of the rectifier may be 5.5 volts (V). When the supply of power is stopped in the electronic device 101, it may be identified that the reception peak voltage 1101 falls so that the output voltage 1102 of the rectifier drops as well. However, the output voltage 1102 of the rectifier may be greater than or equal to a threshold voltage (under voltage lock out (UVLO)) 1103 (e.g., 3.3 V) even after 160 µs. The threshold voltage 1103 may be a value set to prevent in-band communication from being disconnected.

Figure 11B:
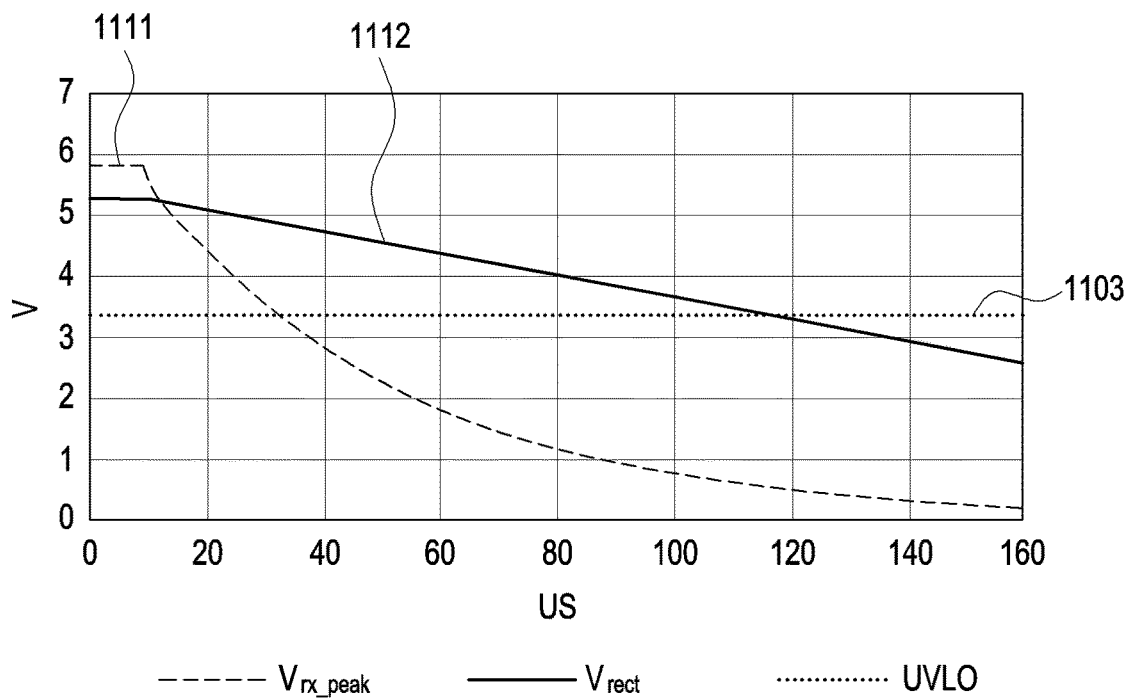
FIG. 11B is a view illustrating a peak reception voltage and an output voltage of a rectifier according to an embodiment.

However, referring to FIG. 11B, in the second load state, the load current of the wireless power receiver 195 may be, e.g., 350 mA, and the initial value of the output voltage of the rectifier may be 5.2V. When the supply of power is stopped in the electronic device 101, it may be identified that the reception peak voltage 1111 falls so that the output voltage 1112 of the rectifier drops as well. In this case, it may be identified that the output voltage 1112 of the rectifier drops below the threshold voltage 1103 (e.g., 3.3 V) at 120 µs.

Referring to FIGS. 11A and 11B, in a load state in which the load current is large, the dropping speed of the output voltage of the rectifier may be relatively fast. Further, as the initial output voltage of the rectifier increases, the time to drop below the threshold voltage 1103 may increase. Accordingly, the wireless power receiver 195 may determine a power application interruption period based on the output voltage and/or the load current of the rectifier. The power application interruption period needs to be set so that the output voltage of the rectifier does not drop below the threshold voltage 1103. For example, the wireless power receiver 195 may calculate the power application interruption period using the output voltage and/or the load current of the rectifier. Alternatively, the wireless power receiver 195 may identify the power application interruption period by referring to a pre-stored lookup table. In the case shown in FIG. 11B, the wireless power receiver 195 may determine that a period shorter than 120 µs is the power application interruption period.

Figure 11C:
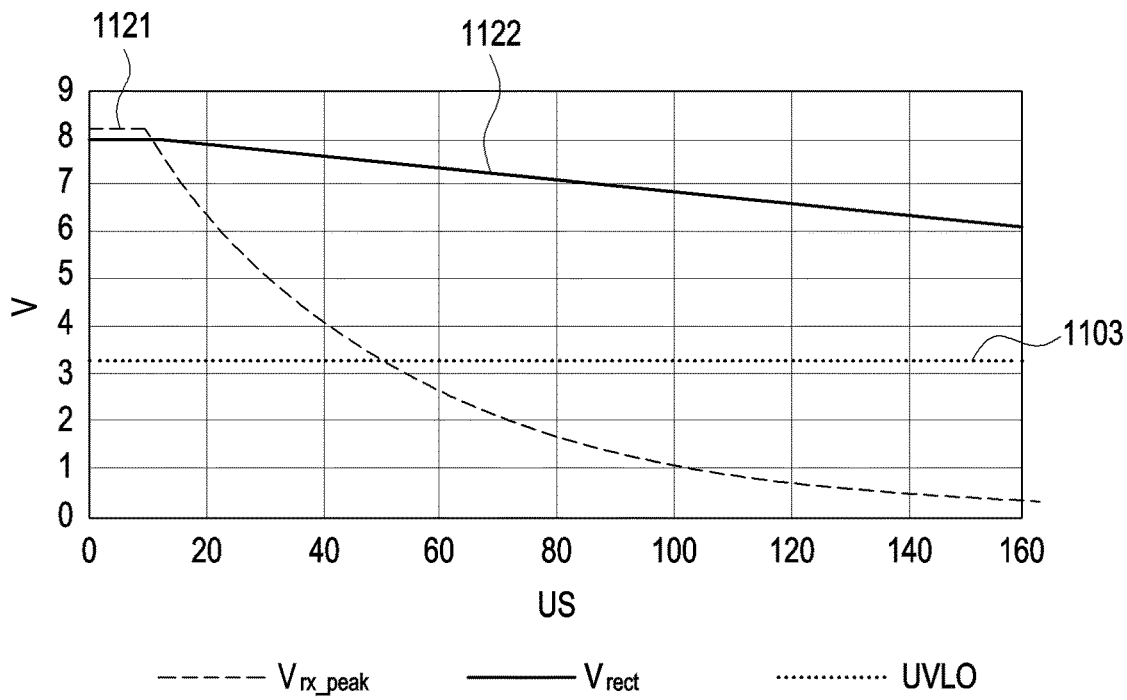
FIG. 11C is a view illustrating a peak reception voltage and an output voltage of a rectifier, according to an embodiment.
Figure 11D:
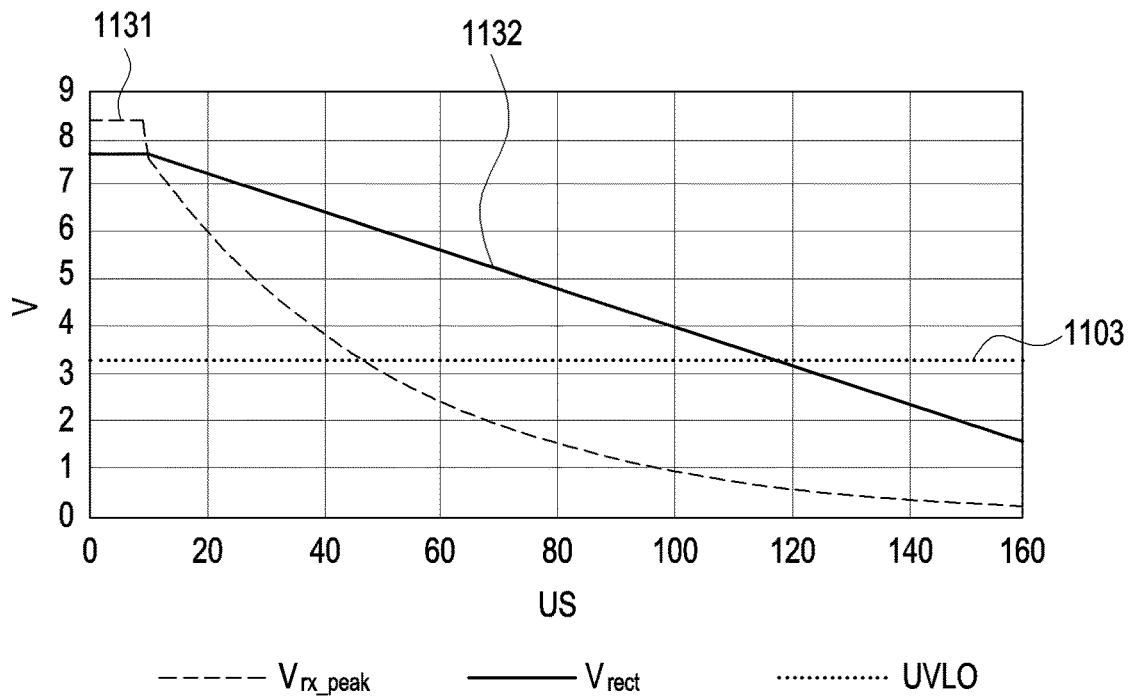
FIG. 11D is a view illustrating a peak reception voltage and an output voltage of a rectifier, according to an embodiment.

Referring to FIG. 11C, in the first load state, the load current of the wireless power receiver 195 may be 200 mA, and the initial value of the output voltage of the rectifier may be 8.0 V. When the supply of power is stopped in the electronic device 101, the reception peak voltage 1121 may fall so that the output voltage 1122 of the rectifier drops as well. However, the output voltage 1122 of the rectifier may be greater than or equal to the threshold voltage 1103 (e.g., 3.3 V) even after 160 µs. Referring to FIG. 11D, in the second load state, the load current of the wireless power receiver 195 may be 700 mA, and the initial value of the output voltage of the rectifier may be 7.7 V. When the supply of power is stopped in the electronic device 101, the reception peak voltage 1131 may fall so that the output voltage 1132 of the rectifier drops as well. In this case, the output voltage 1132 of the rectifier may drop below the threshold voltage 1103 (e.g., 3.3 V) at 120 µs.

Referring to FIG. 11D, the wireless power receiver 195 may determine that a period shorter than 120 µs is the power application interruption period.

Figure 11E:
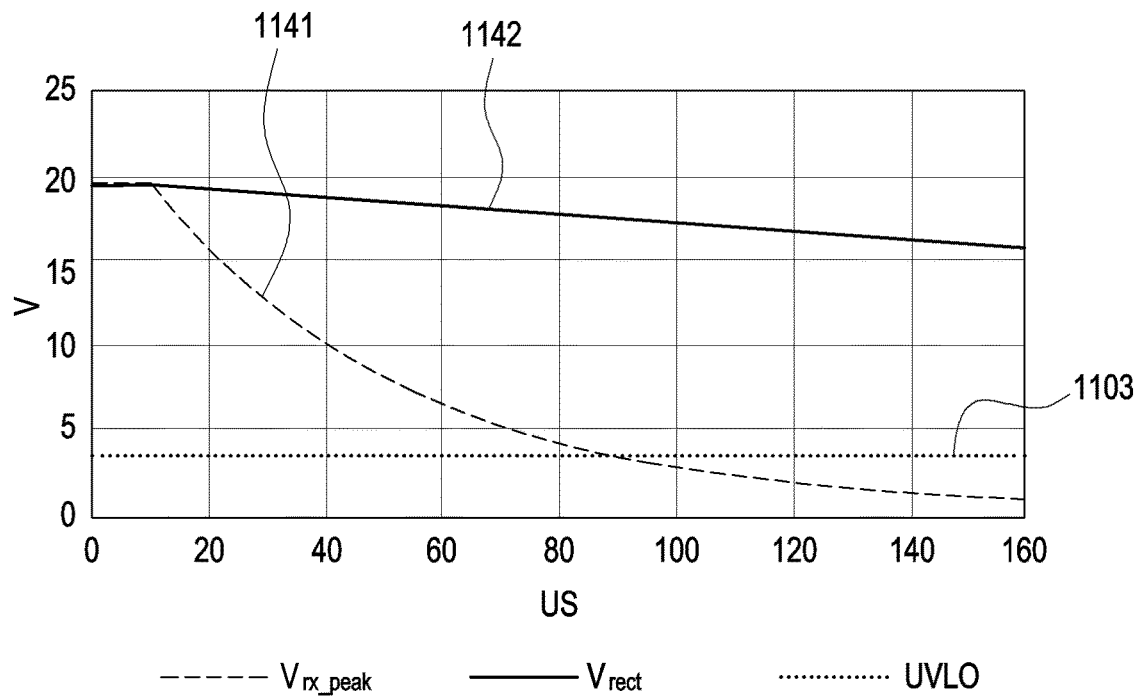
FIG. 11E is a view illustrating a peak reception voltage and an output voltage of a rectifier, according to an embodiment.

Referring to FIG. 11E, in the first load state, the load current of the wireless power receiver 195 may be 200 mA, and the initial value of the output voltage of the rectifier may be 19.5 V. When the supply of power is stopped in the electronic device 101, the reception peak voltage 1141 may fall so that the output voltage 1142 of the rectifier drops as well. However, the output voltage 1142 of the rectifier may be greater than or equal to the threshold voltage (e.g., 3.3 V) 1103 even after 160 µs.

Figure 11F:
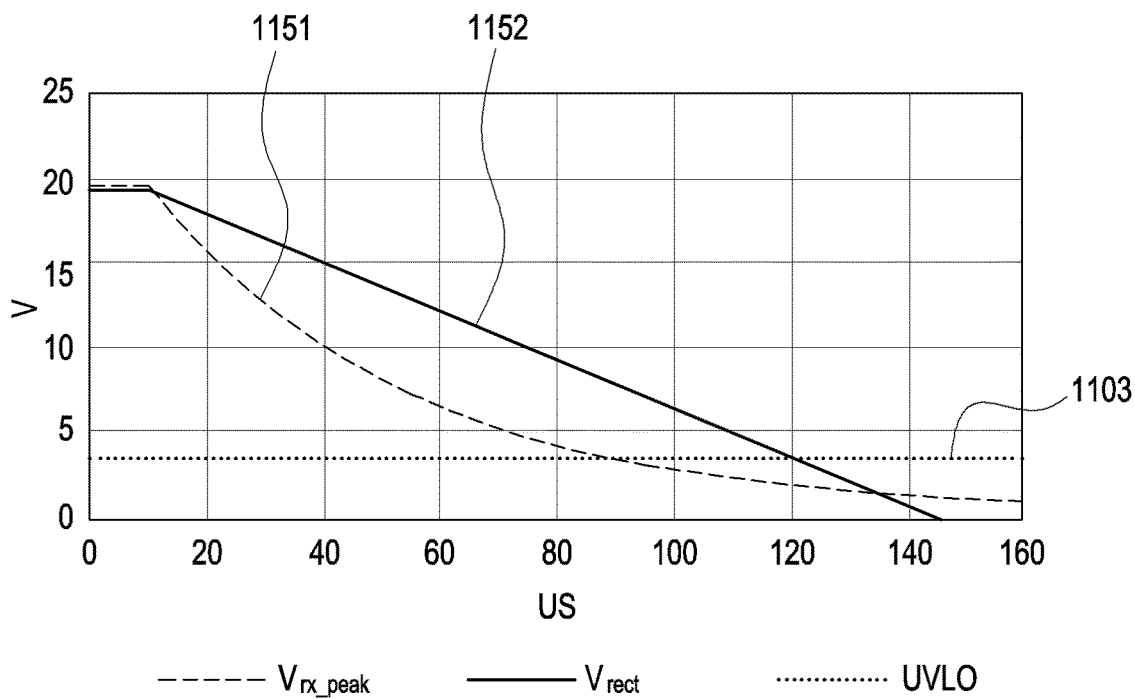
FIG. 11F is a view illustrating a peak reception voltage and an output voltage of a rectifier, according to an embodiment.

Referring to FIG. 11F, in the second load state, the load current of the wireless power receiver 195 may be 1150 mA, and the initial value of the output voltage of the rectifier may be 19.2 V. When the supply of power is stopped in the electronic device 101, the reception peak voltage 1151 may fall so that the output voltage 1152 of the rectifier drops as well. In this case, the output voltage 1152 of the rectifier may drop below the threshold voltage 1103 (e.g., 3.3 V) at 120 μs. In the embodiment shown in FIG. 11F, the wireless power receiver 195 may determine that a period shorter than 120 μs is the power application interruption period.

Referring again to FIG. 10, the wireless power receiver 195 may transmit a data packet including the identified power transmission interruption period in step 1005. As described above, the slot time included in the data packet may be set to differ for each load state. Accordingly, disconnection of the in-band communication due to Q-factor measurement based on interruption of power application may be prevented.

The wireless power receiver 195 may determine the settling time based on the level of the received power and/or the level of the load current. As described above, the wireless power receiver 195 may estimate the output voltage of the rectifier after the power supply is stopped, based on the initial output voltage and load current of the rectifier. The increasing rate of the output voltage of the rectifier after power supply is resumed may also be estimated. The wireless power receiver 195 may determine the settling time by estimating (or referring to) a time required for the output voltage of the rectifier to recover to a certain level. The wireless power receiver 195 may include the identified settling time in the received power packet and transmit the same to the electronic device 101. The electronic device 101 may identify the settling time included in the received power packet and transmit a response (e.g., an ACK packet) after the settling time passes from the time of reception of the received power packet (or the time of interruption of power application or the time of resuming application of power).

Figure 12:
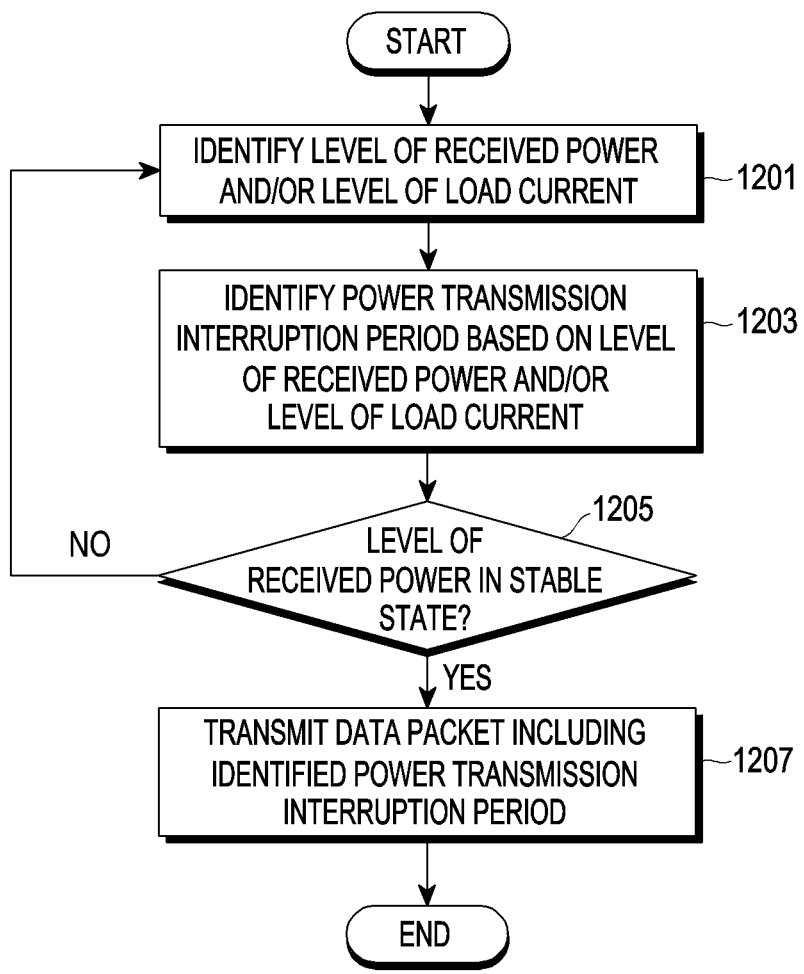
FIG. 12 is a flowchart illustrating a method for operating a wireless power receiver, according to an embodiment.

FIG. 12 is a flowchart illustrating a method for operating a wireless power receiver, according to an embodiment.

The wireless power receiver 195 (e.g., the processor 322) may identify the level of the received power and/or the level of the load current in step 1201. In step 1203, the wireless power receiver 195 may identify a power transmission interruption period based on the level of the received power level and/or the level of the load current. In step 1205, the wireless power receiver 195 may determine whether the level of the received power is in a stable state. When the level of the received power is not in the stable state (NO in step 1205), the electronic device 101 may identify the level of the received power and/or the load current and identify the corresponding power transmission interruption period again. Alternatively, the electronic device 101 may store the identified power transmission interruption period without further identifying the power transmission interruption period. The wireless power receiver 195 may determine whether the level of the received power is in the stable state based on whether the level of the received power (e.g., the level of the output voltage of the rectifier) is greater than or equal to the threshold voltage.

As described above, when the electronic device 101 stops applying power during the slot time, the output voltage of the rectifier in the wireless power receiver 195 may drop. Thereafter, when the electronic device 101 resumes application of power, the output voltage of the rectifier in the wireless power receiver 195 may rise again. The electronic device 101 may wait until the output voltage of the rectifier rises above the threshold voltage. If the electronic device 101 additionally stops applying power when the output voltage of the rectifier does not rise above the threshold voltage, and in-band communication may be cut off due to a drop in the output voltage of the rectifier. Accordingly, the electronic device 101 may refrain from transmitting a data packet until the output voltage of the rectifier recovers above the threshold voltage. When the level of the received power is in the stable state (YES in step 1205), the wireless power receiver 195 may transmit a data packet including the identified power transmission interruption period to the electronic device 101 in step 1207. The electronic device 101 may identify the power transmission interruption period from the received data packet, stop application of power during the identified power transmission interruption period, and identify the Q-factor.

When the electronic device 101, which is the counterpart device, supports the functions of power application interruption and Q-factor measurement, the wireless power receiver 195 may transmit a data packet requesting the power application interruption. When the electronic device 101 complies with at least one first version of the Qi standard (e.g., version 1.2.4 or lower versions), the electronic device 101 may not support power application interruption and Q-factor measurement and, when the electronic device 101 complies with at least one second version of the Qi standard (e.g., version 1.3 or higher versions), the electronic device 101 may support interruption of power application and Q-factor measurement. The wireless power receiver 195 may determine whether the electronic device 101 supports the functions of power application interruption and Q-factor measurement based on the ID packet version.

The wireless power receiver 195 may determine whether the electronic device 101 supports the functions of power application interruption and Q-factor measurement based on the negotiation (NEG) field of the configuration packet (CFG packet). For example, when the value of the NEG field is 0, the electronic device 101 may support the functions of power application interruption and Q-factor measurement. The wireless power receiver 195 may determine whether the electronic device 101 supports the functions of power application interruption and Q-factor measurement based on an ND response from the electronic device 101. When an ND response is identified according to the general request (GRQ)/x packet, the electronic device 101 may support the functions of power application interruption and Q-factor measurement. The electronic device 101, complying with Qi standard version 1.3 or higher and supporting the extended power profile (EPP) mode, may support the functions of power application interruption and Q-factor measurement, and identifying the corresponding information is not limited to a specific type of information. When it is determined that the electronic device 101 does not support the functions of power application interruption and Q-factor measurement, the electronic device 101 and the wireless power receiver 195 may be configured to enter a baseline power profile (BPP) mode, rather than the EPP mode.

The wireless power receiver 195 complying with Qi standard version 1.3 and supporting the EPP mode may be configured to start the operation in the BPP mode at the start time by transmitting a CFG/baseline profile (bp) packet (e.g., the NEG bit is null, and the other fields are set by the value of the CFG/extended profile (ep)). For example, when receiving a precedent ID packet having a version field of Qi standard version 1.3 or higher and the CFG/bp packet from the wireless power receiver 195, the electronic device 101 complying with Qi standard version 1.3 and supporting the EPP mode may transmit an ND response in response to the CFG/bp packet. The wireless power receiver 195 complying with Qi standard version 1.3 and supporting the EPP mode may enter the EPP mode and transmit a GRQ/id packet based on reception of the ND response corresponding to the CFG/bp.

The electronic device 101 complying with version 1.3 and supporting the EPP mode may enter the EPP mode based on reception of the GRQ/id and the precedent ID packet of the field of Qi standard version 1.3 or higher. Thereafter, the electronic device 101 complying with Qi standard version 1.3 and supporting the EPP mode may transmit a TX ID data packet, power transmitter capabilities ('CAP') data packet, and an XCAP data packet of the slot length field for the power receiver (PRx) GRQ/id, /cap, and /xcap data packet. When the wireless power receiver 195 identifies that the value of the slot length field is 0, the wireless power receiver 195 may not transmit the RP1 packet and the RP2 packet while operating at 5 watts (W) or less. When the wireless power receiver 195 identifies a non-zero slot length field value, the wireless power receiver 195 may skip initial calibration and authenticate the electronic device 101. The wireless power receiver 195 may authenticate the electronic device 101 and, if necessary, select a new operating voltage. Thereafter, the wireless power receiver 195 and the electronic device 101 may perform calibration accompanied by Q-factor measurement.

An electronic device 1301 that may be implemented as the electronic device 101 and/or the wireless power receiver 195 is described below, according to an embodiment.

Figure 13:
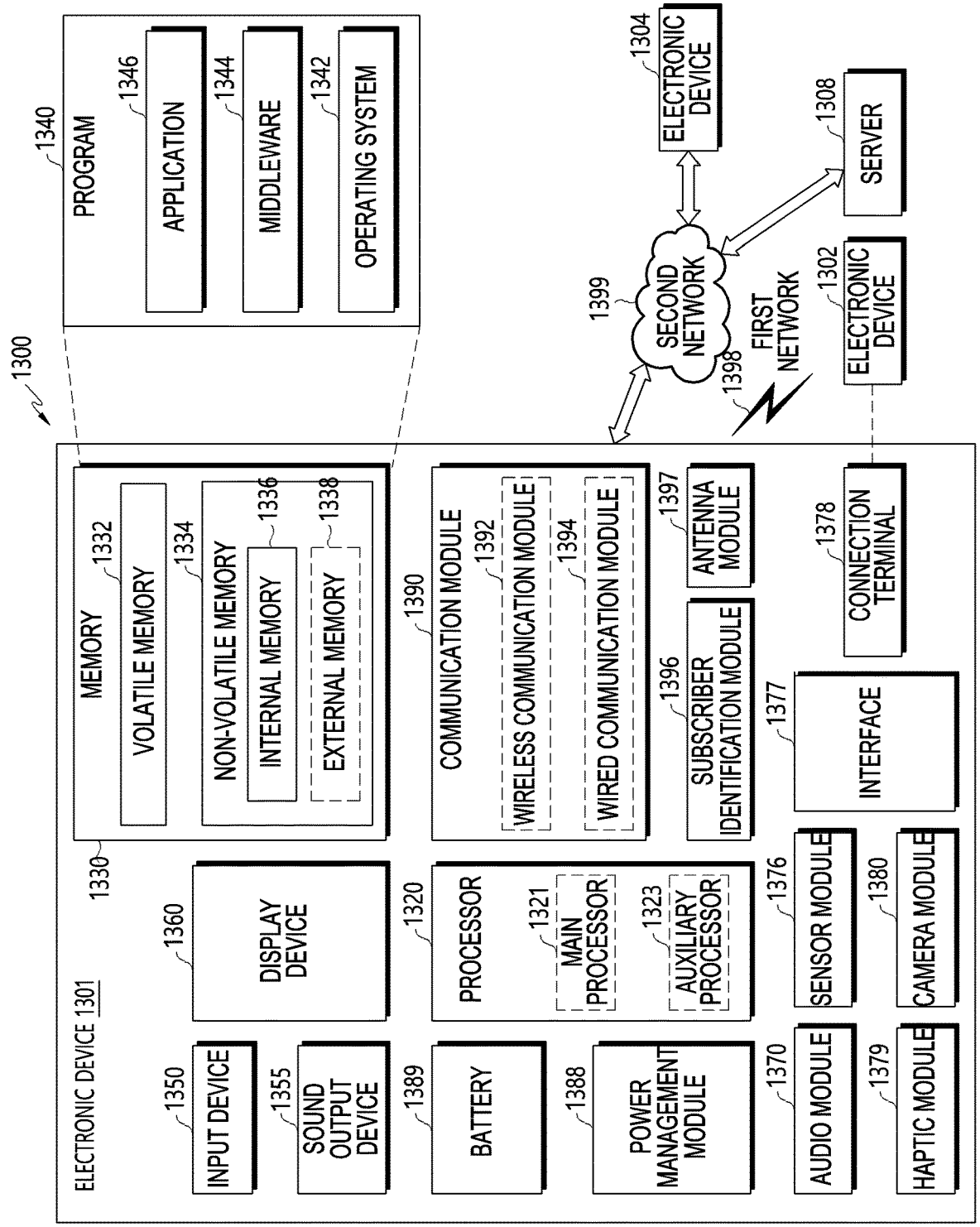
FIG. 13 is a block diagram illustrating an electronic device in a network environment, according to an embodiment.

FIG. 13 is a block diagram illustrating an electronic device 1301 in a network environment 1300 according to an embodiment. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments, at least one (e.g., the connecting terminal 1378) of the components may be omitted from the electronic device 1301, or one or more other components may be added in the electronic device 1301. According to an embodiment, some (e.g., the sensor module 1376, the camera module 1380, or the antenna module 1397) of the components may be integrated into a single component (e.g., the display module 1360).

The processor 1320 may execute, e.g., software (e.g., a program 1340) to control at least one other component (e.g., a hardware or software component) of the electronic device 1301 connected with the processor 1320 and may process or compute various data. According to one embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1301 includes the main processor 1321 and the auxiliary processor 1323, the auxiliary processor 1323 may be configured to use lower power than the main processor 1321 or to be specified for a designated function. The auxiliary processor 1323 may be implemented as separate from, or as part of the main processor 1321.

The auxiliary processor 1323 may control at least some of functions or states related to at least one (e.g., the display module 1360, the sensor module 1376, or the communication module 1390) of the components of the electronic device 1301, instead of the main processor 1321 while the main processor 1321 is in an inactive (e.g., sleep) state or along with the main processor 1321 while the main processor 1321 is an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 123. According to an embodiment, the auxiliary processor 1323 (e.g., the neural processing unit) may include a hardware structure specified for artificial intelligence model processing. The artificial intelligence model may be generated via machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, keys (e.g., buttons), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display 1360 may include, for example, a display, a hologram device, or a projector and control circuitry to control a corresponding one of the display, hologram device, and projector. According to an embodiment, the display 1360 may include a touch sensor configured to detect a touch, or a pressure sensor configured to measure the intensity of a force generated by the touch.

The audio module 1370 may convert a sound into an electrical signal and vice versa. According to an embodiment, the audio module 1370 may obtain a sound through the input module 1350 or output a sound through the sound output module 1355 or an external electronic device (e.g., an electronic device 1302 (e.g., a speaker or a headphone) directly or wirelessly connected with the electronic device 1301.

The sensor module 1376 may detect an operational state (e.g., power or temperature) of the electronic device 1301 or an environmental state (e.g., a state of a user) external to the electronic device 101, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or motion) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or wireless communication channel between the electronic device 1301 and an external electronic device (e.g., the electronic device 1302, the electronic device 1304, or the server 1308) and performing communication through the established communication channel. The communication module 1390 may include one or more communication processors that are operable independently from the processor 1320 (e.g., the AP) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device 1304 via a first network 1398 (e.g., a short-range communication network, such as Bluetooth™, wireless-fidelity (Wi-Fi) direct, or infrared data association (IrDA)) or a second network 1399 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1392 may identify or authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device). According to an embodiment, the antenna module 1397 may include one antenna including a radiator formed of a conductor or conductive pattern formed on a substrate (e.g., a printed circuit board (PCB)). According to an embodiment, the antenna module 1397 may include a plurality of antennas (e.g., an antenna array). In this case, at least one antenna appropriate for a communication scheme used in a communication network, such as the first network 1398 or the second network 1399, may be selected from the plurality of antennas by, e.g., the communication module 1390. The signal or the power may then be transmitted or received between the communication module 1390 and the external electronic device via the selected at least one antenna. According to an embodiment, other parts (e.g., radio frequency integrated circuit (RFIC)) than the radiator may be further formed as part of the antenna module 1397.

According to various embodiments, the antenna module 1397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. The external electronic devices 1302 or 1704 each may be a device of the same or a different type from the electronic device 1301. According to an embodiment, all or some of operations to be executed at the electronic device 1301 may be executed at one or more of the external electronic devices 1302, 1704, or 1708. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra-low-latency services using, e.g., distributed computing or mobile edge computing. In another embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

According to an embodiment, an electronic device includes a power transmitting circuit configured to transmit power to a wireless power receiver, a communication circuit configured to perform communication with the wireless power receiver, and a control circuit configured to control the power transmitting circuit to apply first power to a coil of the power transmitting circuit, control the power transmitting circuit to stop applying the first power and prevent power from being applied (e.g., restrict power from being applied or allow no power to be applied) to the coil during a first period, identify a first Q-factor during the first period, control the power transmitting circuit to apply, to the coil, a second power based on a calibration operation for identifying at least one parameter used for identifying a power loss during power transmission, control the power transmitting circuit to stop applying the second power (e.g., a last power among at least one power based on the calibration operation) and prevent power from being applied to the coil during a second period, identify a second Q-factor during the second period, and identify a validity of the at least one parameter based on at least one of the first Q-factor or the second Q-factor.

The control circuit may further be configured to, when the at least one parameter is determined to be valid, control the power transmitting circuit to apply power for charging the wireless power receiver to the coil, receive a data packet including a received power level from the wireless power receiver, using the communication circuit, while applying the power for charging, identify whether the power loss meets a predetermined condition based on the at least one parameter, the received power level, and a magnitude of the power for charging, and based on the power loss meeting the predetermined condition, determine that a foreign object is placed on the electronic device.

The control circuit may be configured to, as part of controlling the power transmitting circuit to stop applying the first power and prevent power from being applied to the coil 311L during the first period, identify a first received power packet from the wireless power receiver 195, using the communication circuit, and control the power transmitting circuit to allow no power to be applied to the coil during the first period included in the first received power packet.

The first received power packet may be an RP1 packet of a Qi standard. The first period may be identified based on a bit in a slot time field.

The control circuit may further be configured to identify a first settling time included in the first received power packet, and control the communication circuit to transmit a response to the first received power packet based on the first settling time after receiving the first received power packet.

The control circuit may be further configured to identify the at least one parameter using a level of first received power included in the first received power packet. The wireless power receiver may be configured to transmit the first received power packet including the level of the first received power to the electronic device in a first load state.

The control circuit may further be configured to, as part of controlling the power transmitting circuit to stop applying the second power and prevent power from being applied to the coil during the second period, identify a second received power packet from the wireless power receiver, using the communication circuit, and control the power transmitting circuit to prevent power from being applied to the coil during the second period included in the second received power packet.

The second received power packet may be an RP2 packet of a Qi standard. The second period may be identified based on a bit in a slot time field.

The control circuit may further be configured to identify the at least one parameter using a magnitude of a second received power included in the second received power packet. The wireless power receiver may be configured to transmit the second received power packet including information indicating the magnitude of the second received power state to the electronic device in a second load.

The control circuit may further be configured to, as part of identifying the validity of the at least one parameter based on at least one of the first Q-factor or the second Q-factor, determine that the at least one parameter is invalid when a difference between the first Q-factor and the second Q-factor is greater than or equal to a threshold difference, and determine that the at least one parameter is valid when the difference between the first Q-factor and the second Q-factor is less than the threshold difference.

The control circuit may further be configured to, as part of identifying the validity of the at least one parameter based on at least one of the first Q-factor or the second Q-factor, determine that the at least one parameter is invalid when at least one of a first difference between the first Q-factor and a reference Q-factor or a second difference between the second Q-factor and the reference Q-factor is greater than or equal to a threshold difference, and determine that the at least one parameter is valid when at least one of the first difference or the second difference is less than the threshold difference.

The control circuit may further be configured to perform a predetermined operation in a negotiation phase with the wireless power receiver while the first power is applied to the coil.

The control circuit may further be configured to identify the at least one parameter based on a plurality of calibration data points obtained after the predetermined operation is performed in the negotiation phase. The plurality of calibration data points may include a plurality of received power levels corresponding to a plurality of load states of the wireless power receiver respectively and a plurality of transmitted power levels corresponding to the plurality of received power levels respectively.

The control circuit may further be configured to control the power transmitting circuit to apply power for charging the wireless power receiver to the coil, based on the at least one parameter being valid.

According to an embodiment, a wireless power receiver includes a coil configured to receive power from an electronic device, a rectifier configured to rectify AC power output from the coil into direct current DC power, a processor, and a communication circuit. The processor may be configured to control the communication circuit to transmit a first data packet for requesting that a first power is not applied during a first period, while the first power is received, and control the communication circuit to transmit a second data packet for requesting that a second power is not applied during a second period, while the second power is received, based on a calibration operation for identifying at least one parameter used for identifying power loss while transmitted power is received through the coil.

The first received power packet may be an RP1 packet of a Qi standard. The first period may be set based on a bit in a slot time field. The second data packet may be an RP2 packet of the Qi standard. The second period may be set based on a bit in a slot time field.

The first data packet may further include a first settling time, and the second data packet may further include a second settling time.

The processor may further be configured to include a magnitude of a first received power measured in a first load state of the wireless power receiver in the first data packet, and include a magnitude of a second received power measured in a second load state of the wireless power receiver in the second data packet.

The processor may further be configured to identify an output voltage of the rectifier, and identify at least one of the first period or the second period based on the output voltage of the rectifier.

The processor may further be configured to identify a magnitude of current input to a load of the wireless power receiver, and identify at least one of the first period or the second period based on the magnitude of the current input to the load.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 101 and/or the wireless power receiver 195). For example, a processor of the machine (e.g., the electronic device 101 and/or the wireless power receiver 195) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an electronic device, a wireless power receiver, and a method for operating the same, which may verify parameters obtained as a result of calibration, based on the Q-factor identified based on the start and/or end of the calibration. Thus, it is possible to secure the validity of the parameter calculated as a result of calibration and thus to enhance the accuracy of foreign object detection.

Other various effects may be provided directly or indirectly in the disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device for wirelessly transmitting power, the electronic device comprising:
   a power transmitting circuit configured to transmit power to a wireless power receiver;
   a communication circuit configured to perform communication with the wireless power receiver; and
   a control circuit configured to:
   control the power transmitting circuit to apply a first power to a coil of the power transmitting circuit,
   control the power transmitting circuit to stop applying the first power and prevent power from being applied to the coil during a first period,
   identify a first Q-factor during the first period,
   control the power transmitting circuit to apply, to the coil, a second power based on a calibration operation for identifying at least one parameter used for identifying a power loss during power transmission,
   control the power transmitting circuit to stop applying the second power and prevent power from being applied to the coil during a second period,
   identify a second Q-factor during the second period, and
   identify a validity of the at least one parameter based on at least one of the first Q-factor or the second Q-factor.

2. The electronic device of claim 1, wherein the control circuit is further configured to, when the at least one parameter is determined to be valid:
   control the power transmitting circuit to apply power for charging the wireless power receiver to the coil,
   receive a data packet including a received power level from the wireless power receiver, using the communication circuit, while applying the power for charging,
   identify whether the power loss meets a predetermined condition based on the at least one parameter, the received power level, and a magnitude of the power for charging, and
   based on the power loss meeting the predetermined condition, determine that a foreign object is placed on the electronic device.

3. The electronic device of claim 1, wherein the control circuit is configured to, as part of controlling the power transmitting circuit to stop applying the first power and prevent power from being applied to the coil during the first period:
   identify a first received power packet from the wireless power receiver, using the communication circuit, and
   control the power transmitting circuit to prevent power from being applied to the coil during the first period included in the first received power packet.

4. The electronic device of claim 3, wherein the first received power packet is an RP1 packet of a Qi standard, and wherein the first period is identified based on a bit in a slot time field.

5. The electronic device of claim 3, wherein the control circuit is further configured to:
   identify a first settling time included in the first received power packet, and
   control the communication circuit to transmit a response to the first received power packet based on the first settling time.

6. The electronic device of claim 3,
wherein the control circuit is further configured to identify the at least one parameter using a magnitude of a first received power included in the first received power packet, and
wherein the wireless power receiver is configured to transmit the first received power packet including information indicating the magnitude of the first received power to the electronic device in a first load state.

7. The electronic device of claim 1, wherein the control circuit is further configured to, as part of controlling the power transmitting circuit to stop applying the second power and prevent power from being applied to the coil during the second period:
identify a second received power packet from the wireless power receiver, using the communication circuit, and
control the power transmitting circuit to prevent power from being applied to the coil during the second period included in the second received power packet.

8. The electronic device of claim 7, wherein the second received power packet is an RP2 packet of a Qi standard, and wherein the second period is identified based on a bit in a slot time field.

9. The electronic device of claim 7,
wherein the control circuit is further configured to identify the at least one parameter using a magnitude of a second received power included in the second received power packet, and
wherein the wireless power receiver is configured to transmit the second received power packet including information indicating the magnitude of the second received power state to the electronic device in a second load state.

10. The electronic device of claim 1, wherein the control circuit is further configured to, as part of identifying the validity of the at least one parameter based on the first Q-factor and/or the second Q-factor:
determine that the at least one parameter is invalid when a difference between the first Q-factor and the second Q-factor is greater than or equal to a threshold difference, and
determine that the at least one parameter is valid when the difference between the first Q-factor and the second Q-factor is less than the threshold difference.

11. The electronic device of claim 1, wherein the control circuit is further configured to, as part of identifying the validity of the at least one parameter based on the first Q-factor or the second Q-factor:
determine that the at least one parameter is invalid when at least one of a first difference between the first Q-factor and a reference Q-factor or a second difference between the second Q-factor and the reference Q-factor is greater than or equal to a threshold difference, and
determine that the at least one parameter is valid when at least one of the first difference or the second difference is less than the threshold difference.

12. The electronic device of claim 1, wherein the control circuit is further configured to perform a predetermined operation in a negotiation phase with the wireless power receiver while the first power is applied to the coil.

13. The electronic device of claim 12,
wherein the control circuit is further configured to identify the at least one parameter based on a plurality of calibration data points obtained after the predetermined operation is performed in the negotiation phase, and
wherein the plurality of calibration data points include a plurality of received power levels corresponding to a plurality of load states of the wireless power receiver respectively and a plurality of transmitted power levels corresponding to the plurality of received power levels respectively.

14. The electronic device of claim 13, wherein the control circuit is further configured to control the power transmitting circuit to apply power for charging the wireless power receiver to the coil, based on the at least one parameter being valid.

* * * * *